United States Patent [15] 3,673,332

Muller et al. [45] June 27, 1972

[54] TELEPHONE ANSWERING DEVICES

[72] Inventors: Willy Muller, Zollikon/Zurich, Switzerland; Bruno Wurm, Dachau-Rothschwaige; Hermann Haag, Dachau/Buchengassel, both of Germany

[73] Assignee: Willy Muller, Zollikon, Switzerland

[22] Filed: June 3, 1969

[21] Appl. No.: 830,049

[52] U.S. Cl. .......... 179/6 E
[51] Int. Cl. .......... H04m 1/64
[58] Field of Search .......... 179/6 R, 6 E, 6 C

[56] References Cited

UNITED STATES PATENTS

| | | | |
|---|---|---|---|
| 2,530,075 | 11/1950 | Peterson | 179/6 |
| 2,539,139 | 1/1951 | Jordanoff et al | 179/6 |
| 2,816,167 | 12/1957 | Muller et al. | 179/6 |
| 3,067,289 | 12/1962 | Zimmermann | 179/6 |
| 3,234,333 | 2/1966 | Guder | 179/6 |
| 3,527,312 | 9/1970 | Dooley | 179/6 E |

*Primary Examiner*—Howard W. Britton
*Assistant Examiner*—Raymond F. Cardillo, Jr.
*Attorney*—Semmes & Semmes

[57] ABSTRACT

A device for automatic telephone answering which is adapted to play over a text which has been pre-recorded by the user of the device and which can also replay upon command via telephone, messages recorded by callers when actuated by code impulses transmitted through the telephone line. In particular, the present system permits stored messages to be played back and erased by remote control. To effect these functions cyclically the system combines a magnetic recording unit with mechanical drive means in an integrated constructional assembly. In this system, the answering unit and associated means effecting recording and drive thereof are combined into an integrated assembly with control means.

8 Claims, 23 Drawing Figures

INVENTORS
WILLY MULLER
BRUNO WURM
HERMANN HAAG
BY John Gibson Semmes
ATTORNEY

Patented June 27, 1972 3,673,332

14 Sheets-Sheet 2

INVENTORS
WILLY MULLER
BRUNO WURM
HERMANN HAAG

BY John Gibson Semmes
ATTORNEY

Patented June 27, 1972

3,673,332

14 Sheets-Sheet 3

INVENTORS
WILLY MULLER
BRUNO WURM
HERMANN HAAG

BY John Gibson Semmes
ATTORNEY

INVENTORS
WILLY MULLER
BRUNO WURM
HERMANN HAAG

BY John Gibson Semmes
ATTORNEY

INVENTORS
WILLY MULLER
BRUNO WURM
HERMANN HAAG

BY *John Gibson Semmes*
ATTORNEY

INVENTORS
WILLY MULLER
BRUNO WURM
HERMANN HAAG
John Gibson Semmes
ATTORNEY

Patented June 27, 1972 3,673,332

14 Sheets-Sheet 7

INVENTORS
WILLY MULLER
BRUNO WURM
HERMANN HAAG

BY John Gibson Semmes
ATTORNEY

INVENTORS
WILLY MULLER
BRUNO WURM
HERMANN HAAG

BY John Gibson Semmes
ATTORNEY

INVENTORS
WILLY MULLER
BRUNO WURM
HERMANN HAAG
BY John Gibson Semmes
ATTORNEY

Patented June 27, 1972

3,673,332

14 Sheets-Sheet 10

INVENTORS
WILLY MULLER
BRUNO WURM
HERMANN HAAG
BY John Gibson Semmes
ATTORNEY

INVENTORS
WILLY MULLER
BRUNO WURM
HERMANN HAAG
BY John Gibson Semmes
ATTORNEY

Patented June 27, 1972 3,673,332

14 Sheets-Sheet 12

INVENTORS
WILLY MULLER
BRUNO WURM
HERMANN HAAG

BY John Gibson Semmes
ATTORNEY

INVENTORS
WILLY MULLER
BRUNO WURM
HERMANN HAAG

John Gibson Semmes
ATTORNEY

INVENTORS
WILLY MULLER
BRUNO WURM
HERMANN HAAG
BY John Gibson Semmes
ATTORNEY

TELEPHONE ANSWERING DEVICES

The present invention relates to devices for the automatic answering of telephone calls, providing for the possibility of recording messages from callers, together with code-controlled remote control by the user of the device when he rings it up so that, after the device has responded to the code, messages recorded from previous callers are played back to the user.

In devices of this type, not only in an "answering text" played over to a caller but the caller is also presented with the possibility of dictating a message which is recorded by the device in a particular recording part. Remote control enables the owner or authorized user to listen to telephone messages. In order to provide for control of the device and in order to prevent authorized persons from hearing the messages which have been recorded, the switching over of the operation of the device from the first mode, in which messages from callers are recorded, to the second mode in which the messages are played back, is brought about by means of phonetic signals given in the form of a code. For example, one presents an intonement of the vowel "A" at particular intervals in a code text stored in the device. As regards the time allowed for callers to record a message, two types of such devices are to be distinguished; a first type working on the "fixed-time" principle with a limited maximum duration for a single message, and devices with a duration of message recording which can be varied at will.

The present invention relates to a telephone answering device operating on a fixed-time principle as regards the recording of messages. Such devices and the possibility of remote control in response to a code have been previously proposed.

The present invention more particularly represents a further development of a telephone answering device in accordance with application Ser. No. 775,488 filed 11/13/68 and entitled: Telephone Answering Machines With Upright Head Positioning in the names of the present applicants and now U.S. Pat. No. 3,597,545. The subject matter of said earlier patent application is a telephone answering device which is not capable of recording messages from callers and therefore not provided with any remote control facility by a caller, that is to say by the regular user of the device. In accordance with the device of the earlier patent application, however, elements such as the answering unit and the control unit are so constructed that they can be used, without any substantial modification for answering devices which are capable of recording messages from callers and, possibly, by remote control. This possibility of further development is obviously a substantial advantage, bringing with it a simplification and economy in production and servicing.

The present invention is thus based on a device for automatic telephone answering, adapted to play over a text which has been pre-recorded by the user of the device to a telephone caller, comprising: an answering unit for recording and playback of the answering text; a magnetic tape recording unit, forming part of the answering unit; a mechanical drive means for the tape recording unit; electrical control means; a main selector switch for selecting modes of operation of the electrical circuit means in accordance with various circuit configurations; and a control unit for automatically controlling the cyclical functioning of the device during a cycle of functions in the various modes of operation, the answering unit with the tape recording unit and the mechanical drive means being associated in a combined constructional assembly as integrated device unit with the control means.

In accordance with preferred features of the invention, the speech controlled code switch herein comprises push button contacts for setting different code numbers. There is a general code relay for switching the device over from answering operation in which a telephone caller is answered and a message from him recorded, to code operation, in which there is a code-controlled operation by the caller of the device via a telephone line for causing messages recorded by a previous caller to be transmitted to the caller.

In this instance the magnetic recording medium or carrier for the answering text can be in the form of a disc-shaped carrier or medium arranged on a rotating turntable, the magnetic carrier being provided with two magnetic heads and two erasing heads. Part of the recording medium, for example the radially outer half, may carry the message to be given to a caller, for example an introductory announcement part of the text, such as an invitation to speak, a confirmation that recording has been carried out and possibly closing words. Another part, for example a radially inner part of the recording medium, can carry the code text, which is played over to the user of the device in the case of remote control, to enable the user to respond properly to the code. The construction of the recording carrier or medium and the adjustable holding means for the magnetic heads are, conveniently, in accordance with the earlier patent application Ser. No. 775,488.

The same applies for the control means, combined with the answering unit and driven by it via a stepdown drive. The control device can be provided with control contact track discs and sets of contacts cooperating with them. The construction of the control contact track discs and the sets of contacts can also conveniently be in accordance with the earlier application.

There is also the feature herein of speech currents from a telephone channel being supplied to the speech switch via a filter whose pass characteristic is restricted to a narrow band or bands during, remote controlled in response to the code for driving the above-mentioned pre-set speech frequencies, the release time of a relay controlled by the speech switch being capable, of being prolonged by the automatic switching into circuits of a condenser, so that the release time is longer during answering operation than during code or remote control operation.

In accordance with a further advantageous feature of the invention, the electrical circuit means may comprise a time switch; a relay means for starting the time switch at the beginning of each recording of a telephone-transmitted messages; and an output relay for cutting off recording of a message after a fixed time has elapsed. Thus, the device comprises a forward tape travel control magnet for controlling forward tape travel in the taPe recording unit; first contact means of the output release relay, controlled by the timing switch; second contact means of the slow release relay, controlled by the speech switch, the first and second contact means being connected together in series for the supply of energization current to the forward tape travel control magnet so that on the expiry of the maximum time allowed for the recording of a message, the recording connection iS interrupted by release of the output relay, controlled by the timing switch and, by the release of the relay controlled by the speech switch if the caller ceases to speak for more than a given interval, the given interval corresponding to a release time of the relay controlled by the speech switch this release time being made longer than the release time during code operation.

The electrical circuit herein comprises: a recording amplifier; two inputs of the recording amplifier; an output of the recording amplifier; a microphone; means for connecting the microphone with one input of the amplifier; means for connecting the other input of the amplifier with telephone lines for amplifying telephone speech currents; a magnetic head, forming part of the additional recording unit, connected to the output of the amplifier, the filter and speech switch also being connected with the amplifier output; and an output amplifier and loudspeaker, the output amplifier being connected with the first-mentioned amplifier. A hybrid circuit can be provided, permanently connecting the recording amplifier with the telephone lines.

In accordance with a still further feature of the invention, the recording amplifier comprises a volume limiting circuits, serving to automatically limit the output volume of the amplifier, so that the volume has a constant signal level. The limiting circuit comprises a transistor in the input circuit of an amplifying stage, the transistor being connected so as to be free of DC voltage sO as to act as a controlled variable shunt resistance. In detail, this arrangement may be such that as the variable shunt resistance, the volume limiting circuit comprises the emitter-controlled loop of the regulating transistor, the latter being driven in an emitter-base circuit and having its conductivity controlled by an additional control transistor which is responsive to the amplifier output.

The volume limiting circuit in accordance with the invention ensures that starting at a certain signal input level, messages are recorded with an even volume, while on the other hand the volume limiting circuit in accordance with the invention avoids saturation of the amplifier and non-linear distortion which might impair the function of the speech switch.

The magnetic recording unit for recording and storing incoming telephone messages may be a conventional tape recording unit which is connected by a stepdown drive with a marking drive with which the tape recording unit cooperates for automatic location of tape start, tape end, and the end of the last message recorded on the tape. The marking drive may comprise a gear wheel connected by the stepdown drive in accordance with rotation of a supply spool of the winding station of the tape recorder with such a stepdown ratio that after full forward travel of the tape recording unit there is a rotation of the marking drive gear wheel of about 350°. The device may comprise: an actuating projection on the periphery of the gear wheel, which is driven by the stepdown drive, of the marking drive; contacts on the projection for locating tape start and tape end; a slipping clutch; a slipping clutch disc arranged to be driven by the slipping clutch from the drive gear wheel; a further actuating projection on the slipping clutch disc; a marking contact which cooperates with the further actuating projection for marking the end of the last message recorded on the tape.

In accordance with a still further feature of the invention, the device comprises a marking magnet, an armature of the marking magnet, and a locking bolt provided on the armature, the actuating projection, on the sliding clutch disc, cooperating with the marking contact, being locked during slow forward travel of the tape recording unit in the non-energized position of the magnet in a position corresponding to the closed position of the marking contact by a locking bolt provided on the armature of the marking magnet, it being released out of the blocked position only during rapid reverse movement of the tape recorder, the marking magnet being energized during this movement.

The main selector switch can be arranged to be set in the following different positions corresponding to different modes of operation:

I. Telephone operation: operation of the device connected with the telephone channel for answering incoming calls of third parties, for recording a message together with remote control, by the user of the device via the telephone, for listening to and remote controlled erasure of messages recorded during previous telephone answering operations.

II. Internal recording: that is to say recording of internal messages on the tape recorder unit; and internal playback for playback of previously recorded messages.

III. Check playback of text of answering message for a playback check of the telephone answering message on the magnetic carrier of the answering unit, and of the code text.

IV. Recording of a telephone answering text for recording the telephone answering message to be played to a caller; the device further comprising a rotary knob connected with the main selector switch, and a lock for preventing unauthorized rotation of the knob.

To prevent unauthorized use of the device the knob for operating the main selector switch is cylindrical. The device further comprises: a stationary part underlying the knob, the stationary part having an arcuate slot; a projection on the lock extending into the slot; a key for the lock; the key being arranged to turn the lock pin projection in the slot to move the lock pin clear of obstructing parts of the stationary part in the slot, thus making rotation of the knob conditional upon operation of the key.

A telephone answering device in accordance with the invention is shown in the accompanying drawings wherein.

Figures 12, 13, 13A:
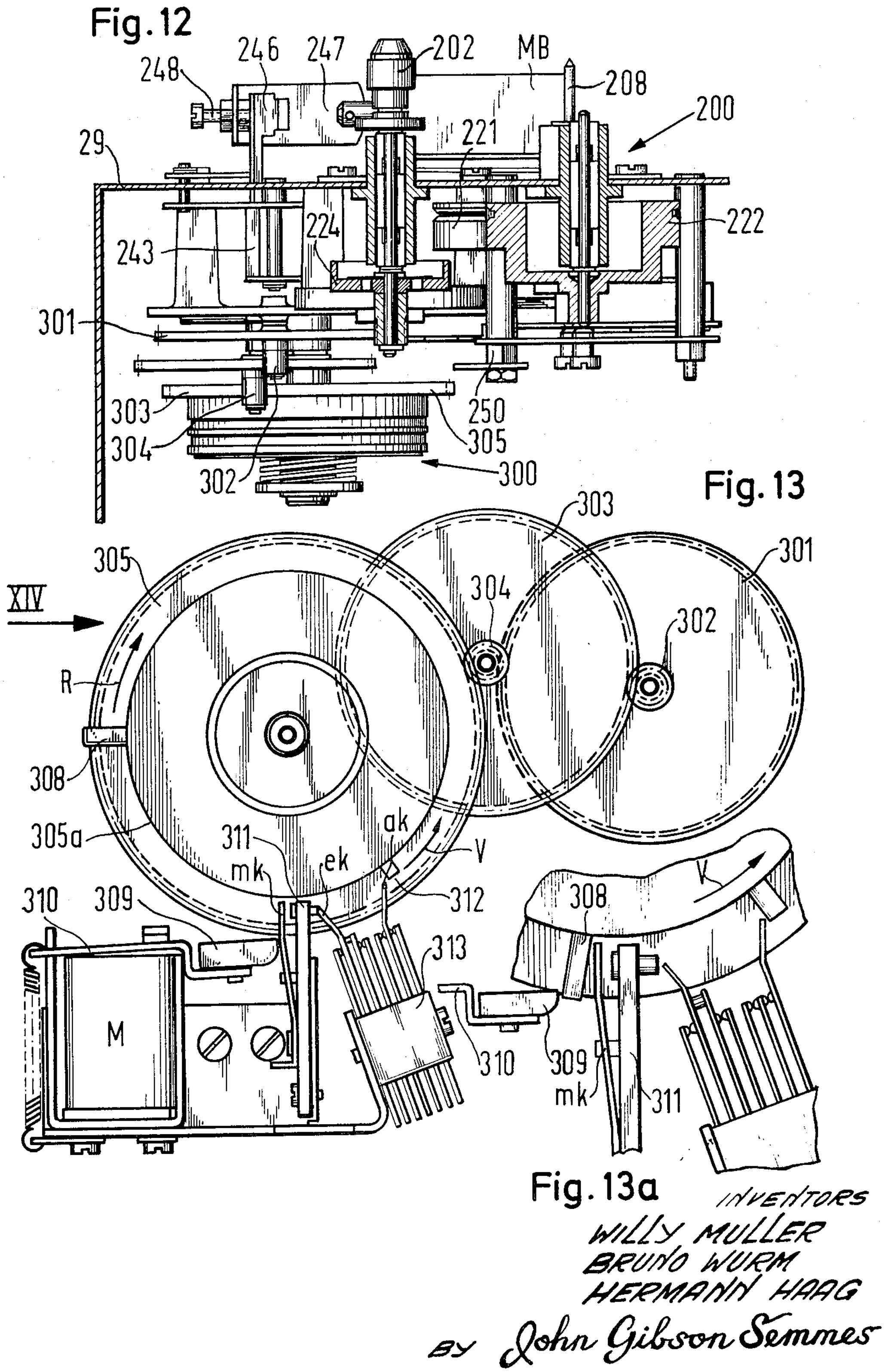
FIG. 12 is a section of the tape recorder unit on the line XII—XII of FIG. 10.
FIG. 13 is a view from below of the marking drive cooperating with the recording tape device.

FIG. 13*a* is a detailed view of the marking drive.

Figure 14:
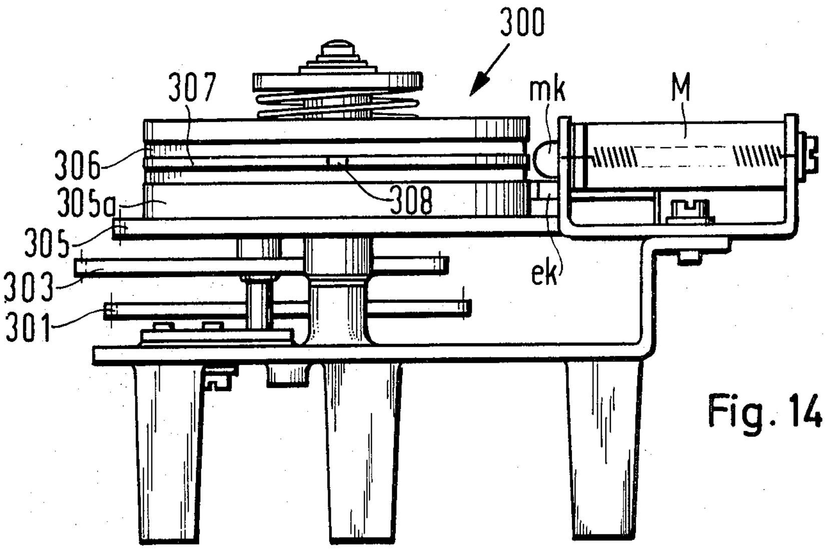

FIG. 14 is a side view of the marking drive looking in the direction of the arrow XIV in FIG. 13.

Figure 15:
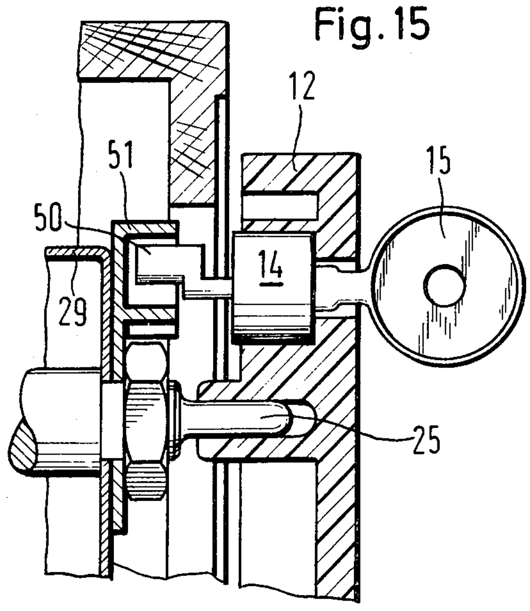

FIG. 15 is a section through the main selector switch at the front of the device indicating the switch lock.

Figure 16:
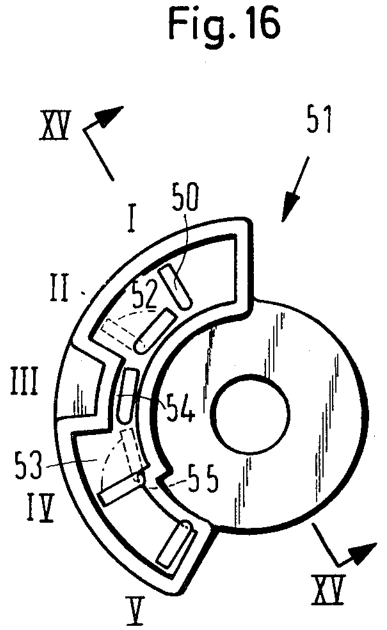

FIG. 16 is a front view of the lock, fixed to the chassis, of the switch. The various positions of the lock pin cooperating with the lock part being indicated as they occur during setting of the selector switch into positions corresponding with the various modes of operation.

Figures 1, 17:
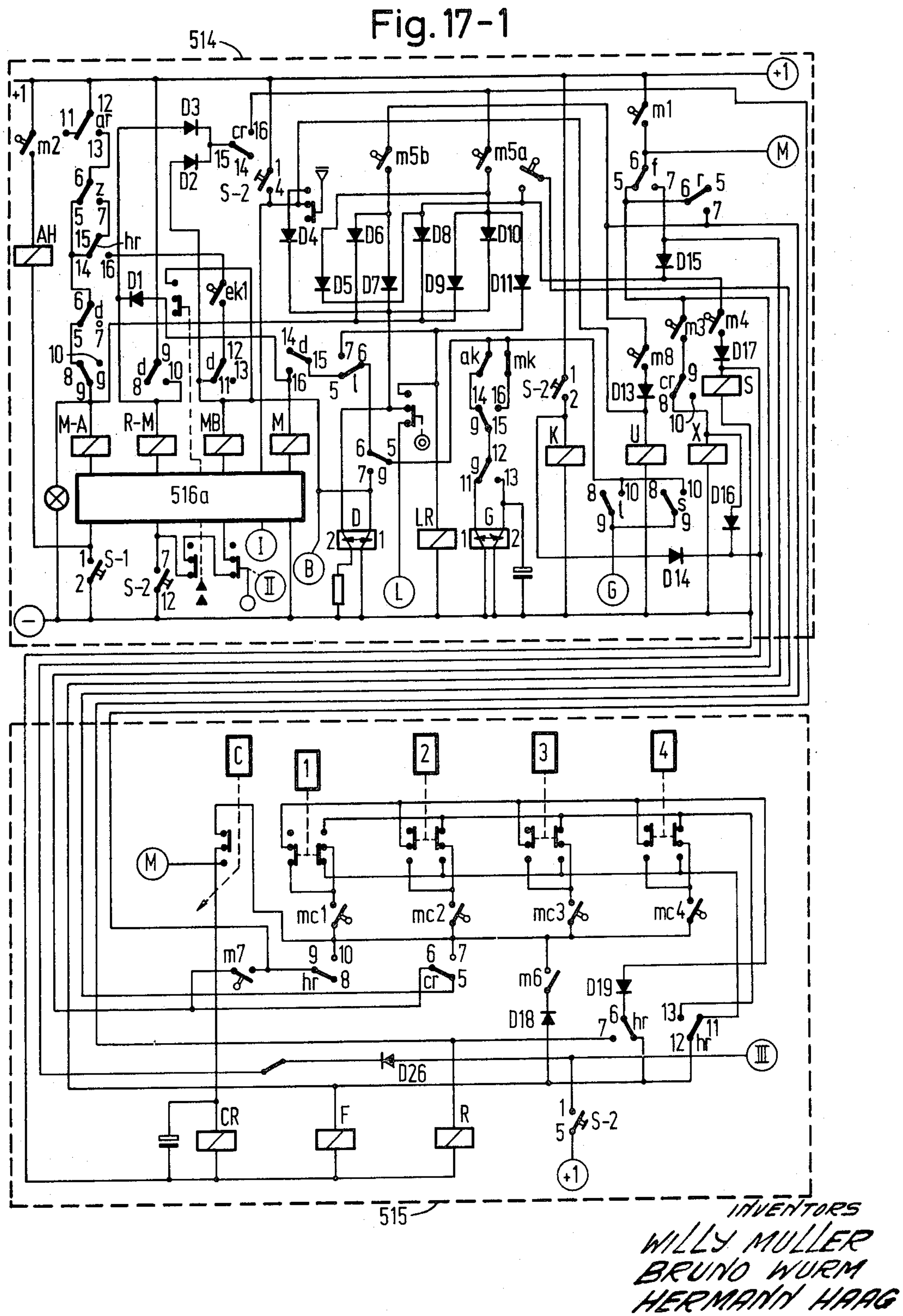

FIG. 17 is a simplified block diagram of the electrical circuit of the telephone answering system herein.

Figures 2, 17, 17A:
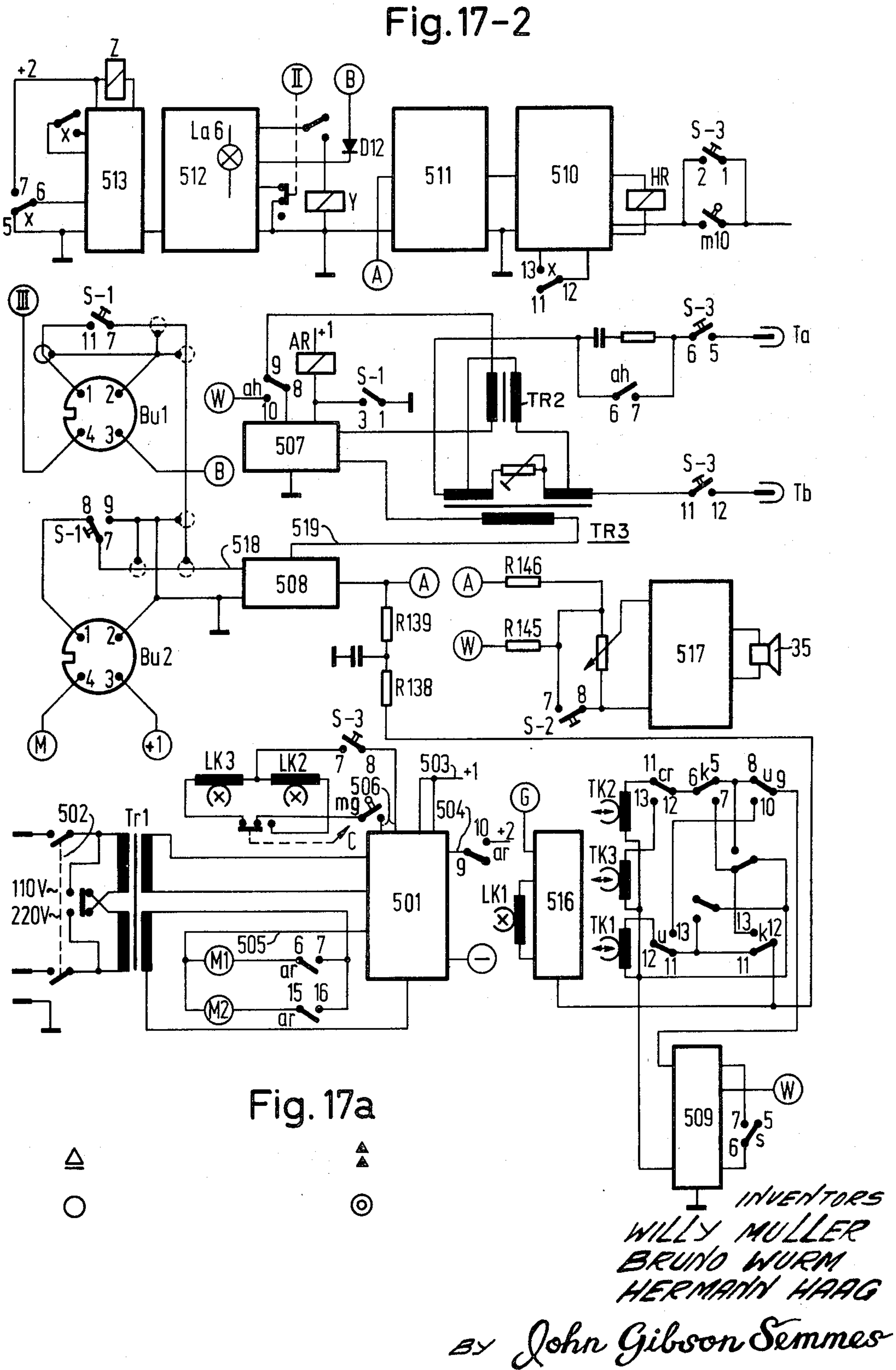

FIG. 17*a* indicates the symbols used in FIG. 17.

Figure 18:
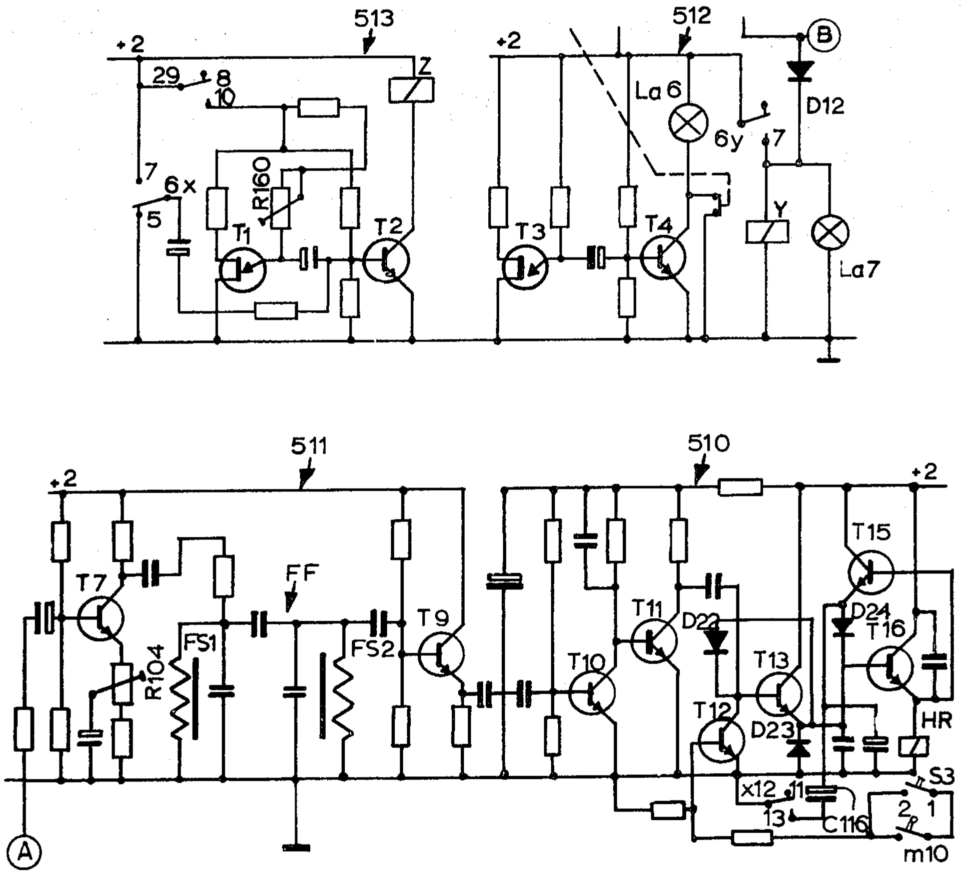

FIG. 18 is a detailed circuit diagram of the time switch, the flash circuit, the filter circuit, and the speech switch.

Figure 19:
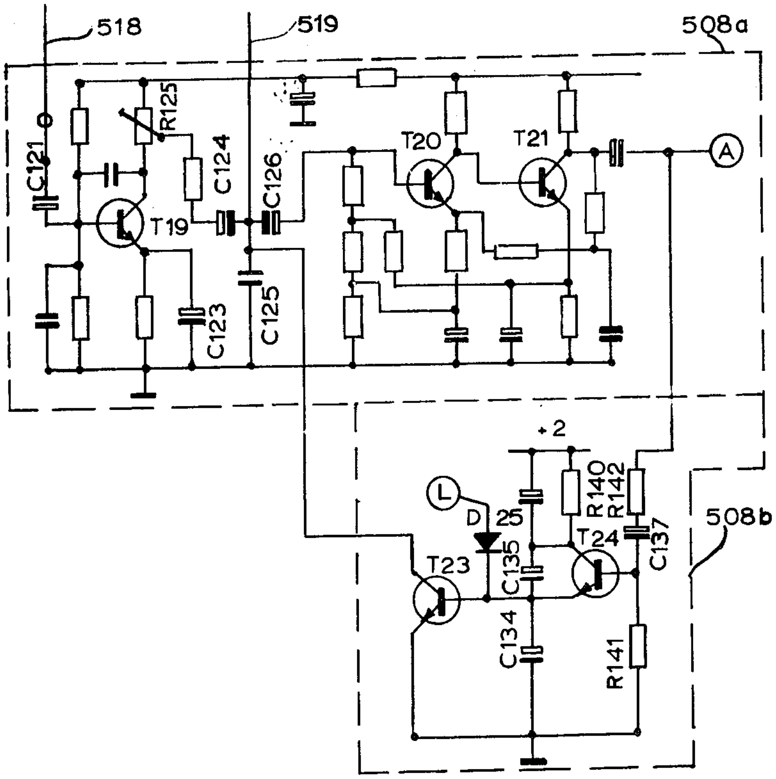

FIG. 19 is a detailed circuit diagram of the recording amplifier with the volume limiting circuit in accordance with the invention.

Figure 20:
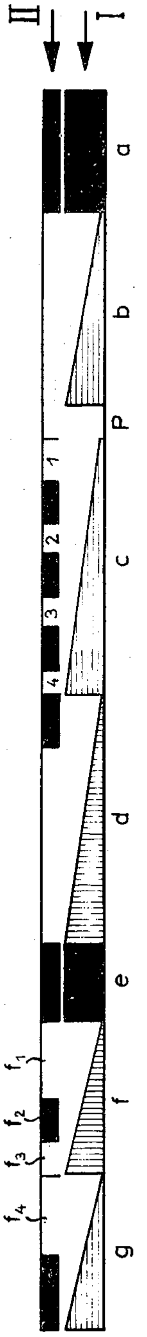

FIG. 20 is a developed view of the periphery of the indicating disc depicting the indicating scale on the control unit.

Figure 21:
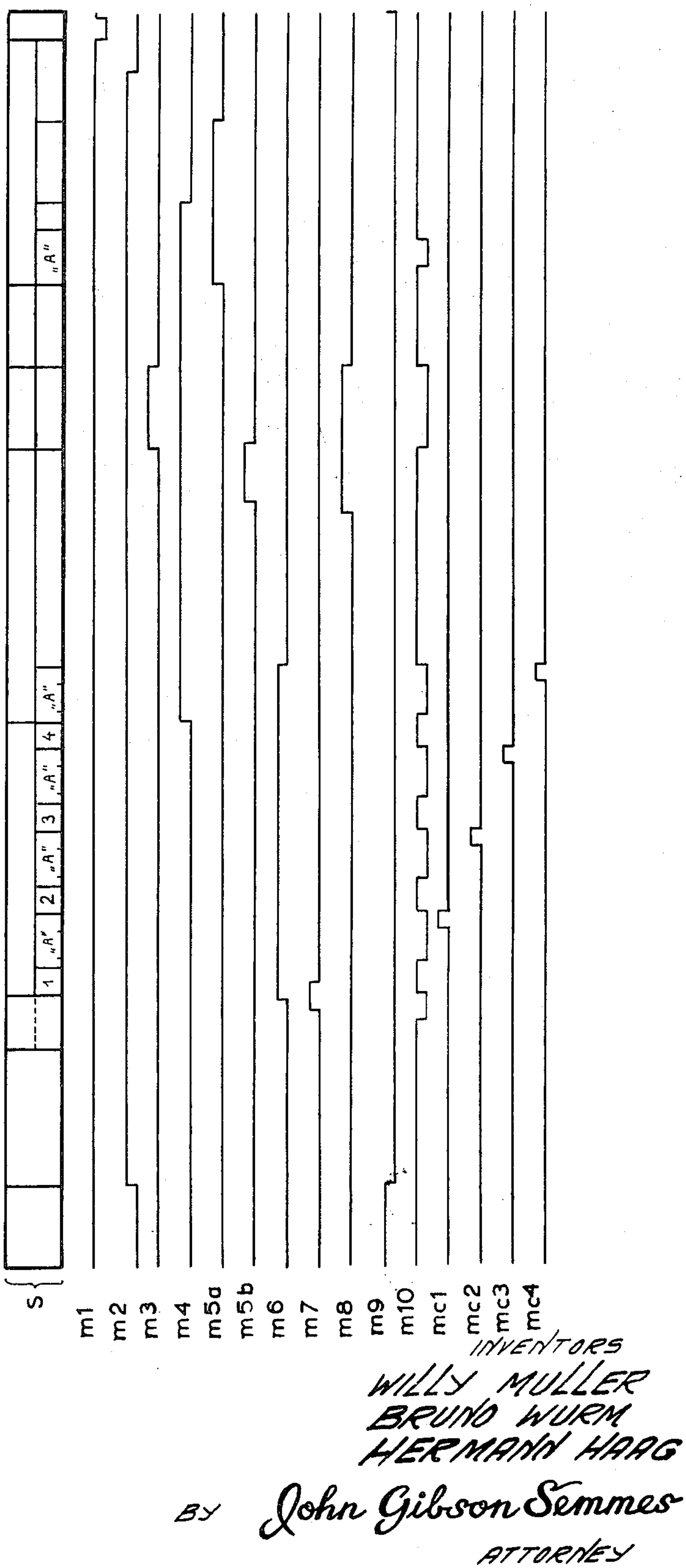

FIG. 21 is a time diagram of operation of the individual switching contacts of the control unit during the course of a cycle of functions of the telephone answering device.

EXTERNAL FEATURES OF THE DEVICE

Figures 1, 2, 3:
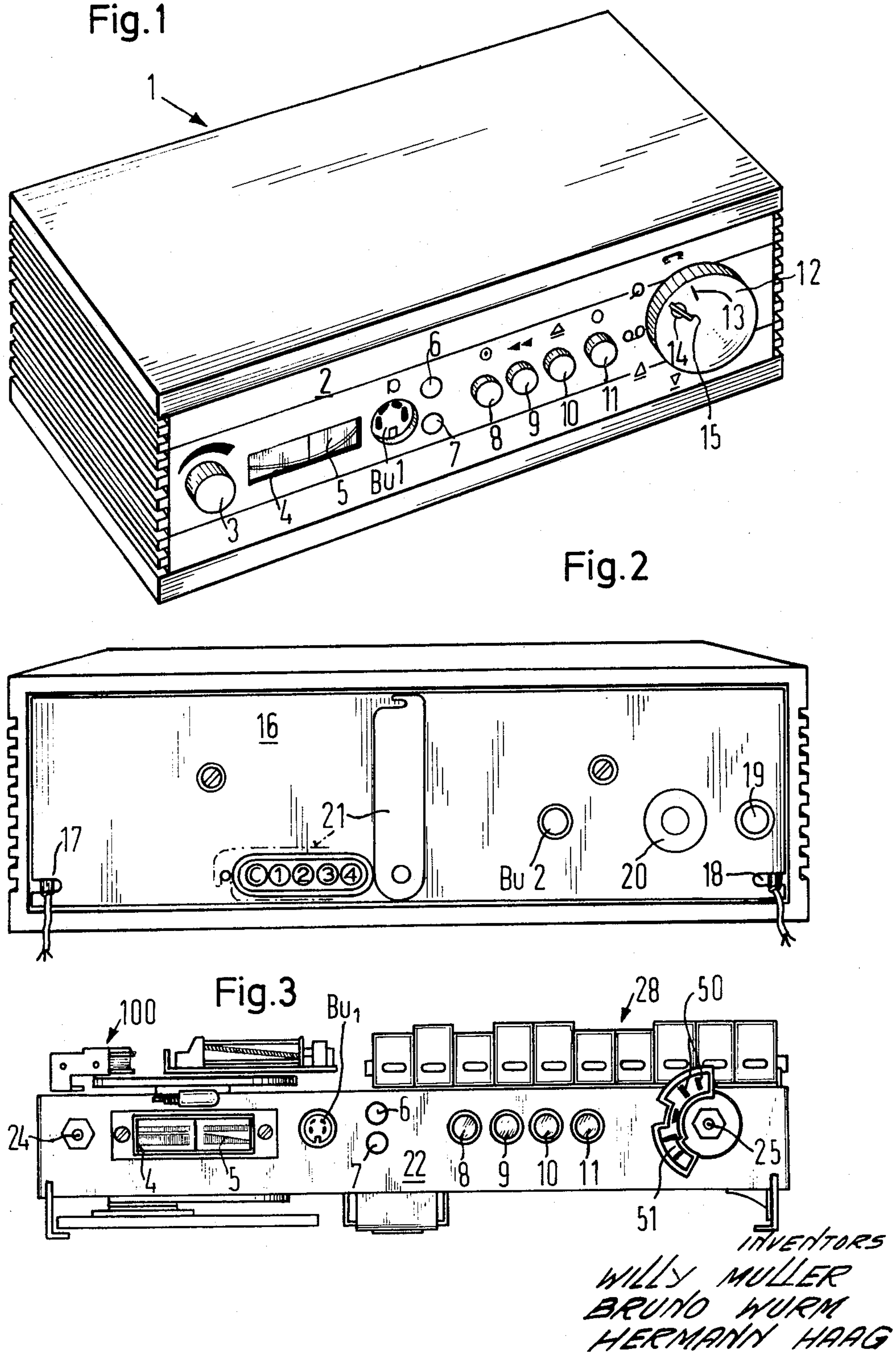
FIG. 1 is an isometric representation of the overall device.
FIG. 2 is a rear view of the chassis accommodated in the housing.
FIG. 3 is a front view of the chassis with the external housing removed.

FIG. 1 shows the answering device in accordance with the invention in perspective view as a whole. The device is accommodated in a rectangular housing 1 consisting of any suitable material, for example wood suitably chosen and finished to meet aesthetic requirements. At the front of the device there is a front plate 2, preferably of metal, on and in which the control and indicating means are provided. These means include a rotary knob 3 which serves for operating an on-off switch and for volume control; a viewing window 4 through which an indicating scale 5 (see developed view in FIG. 20) is visible on the periphery of a rotary disc (that is to say the turntable 154 of a control unit, see FIG. 7). This scale indicates the course of a cycle of functions of the device to the user. Mounted at the front plate 2 there is also a first microphone socket Bu1 for connection of a microphone (not shown) for recording internal messages on the magnetic tape recorder unit of the device; 6 and 7 indicate check lights (denoted by La6 and La7 in FIG.

17) indicating normal or telephone operation and in particular internal manner of operation respectively; reference numerals 8 9, 10, and 11 denote pushbuttons for the use of the tape recorder unit internally, that is to say not in connection with telephone lines. The pushbutton 8 is an erase button, the pushbutton 9 serves for rapid reverse, the pushbutton 10 for playback of recorded matter, and pushbutton 11 for stopping the tape. In the diagram of FIG. 17 the pushbuttons are indicated by the symbols given in FIG. 17*a*. Pushbutton 9 is provided with a detent for holding in the pushed-in position. These "internal" operating knobs thus serve for operation of the tape recorder unit in the device. They serve for the recording of internal messages, for the playback of such messages, or for the playback of messages recorded during preceding telephone operation, as well as for internal erasure of such messages. Reference numeral 12 denotes an actuating knob for the main selector switch S (see also FIG. 17) which serves for setting device in five different modes of operation in five different positions I to V. The positions of the main selector switch S are indicated by the index mark 13 on the knob 12 to cooperate with various indicating symbols suitably mounted on the front plate. Starting at the top these motes of operation are as follows: Mode of operation I: "telephone operation", that is to say operation of the device connected with a telephone channel for answering incoming calls of third parties so as to provide the possibility of recording a message, together with remote control by the user of the device via the telephone for listening to and, if required, remote controlled erasure of messages recorded during previous telephone answering operation.

Mode of operation II: "internal recording", that is to say recording of internal messages on the tape recorder unit serving as a storage means. In this case a microphone is plugged into the socket Bu1.

Mode of operation III: "internal playback" that is to say playback of previously made recordings on the tape recorder unit, which may be internal recordings or messages recorded in previous telephone answering operation, by the user of the device.

Mode of operation IV: "check playback of text of answering message" for a playback check of the telephone answering message on the magnetic carrier of the answering unit, and of the code text.

Mode of operation V: "recordal of telephone answering text" for recording the telephone answering message, that is to say a message proper, an indication that the caller should speak, a confirmation that recording has been carried out, and closing words, in the answering part of the answering unit, and for recording the code text in the code part of the answering unit.

The operating knob 12 of the main selector switch S is provided with a lock 14 to prevent unauthorized use of the device, and more particularly to prevent a playback of recorded messages by unauthorized persons. The lock is so constructed that the main selector switch can be freely moved between the positions I and II, in which unauthorized playback of messages is not possible, while for setting in the following positions, that is to say modes of operation, III to V, it is necessary to use key 15 to operate the lock. For movement from position II in positions III and IV the key must be turned clockwise through 90° while for movement from position IV into position V the key must be turned again through 90° anticlockwise.

FIG. 2 is a view of the rear side of the device. In the rear chassis wall denoted by general references numeral 16 there is a hole for the telephone line 17 and a hole for the line cable 18. Reference numeral 19 denotes a line switch while reference numeral 20 denotes a voltage changeover switch. Bu2 denotes a further microphone connection socket serving for recording texts, that is to say the text of a message for answering a caller and the code text on the magnetic carrier of the answering unit. Reference 21 denotes a code circuit unit which is shut off by a plate. Under the plate there are the push buttons shown in the code part 515 in the circuit diagram of FIG. 17. Reference letter C denotes a general code switch associated with code number pushbuttons with the numbers "1", "2", "3", "4". These pushbuttons can be used by the user of the device to set any desired combination of numbers as a remote control code.

FIG. 3 is a front view of the chassis of the device removed from the housing of the device. As is apparent, the chassis plate is flanged or bent downwards at the front. The chassis front plate 22 thus formed carries the indicating and operating means already described with reference to FIG. 1. Thus 24 denotes the spindle of the combined volume control and line switch (FIG. 1). Reference numeral 4 again indicates the viewing window for the indicating scale 5. On the right-hand side of FIG. 3 reference numeral 25 can be seen to indicate the spindle of the main selector switch S with which the modes of operation are selected. Arranged about the spindle 25 there is a casting 51 mounted rigidly on the front of the chassis. The casting 51 cooperates with the lock pin 50 (FIG. 1) as will be described below with reference to FIGS. 15 and 16. On the upper face of the chassis plate, as shown in FIG. 3, there are relays 28 of the relay unit 514 (see FIG. 17). On the left of FIG. 3 the upper part of the answering unit, denoted by general reference numeral 100, can be seen together with the control unit placed beneath it. The combined answering and control unit 100 will be described with reference to FIGS. 6 to 9 in detail below.

GENERAL INTERNAL FEATURES OF THE DEVICE

Figure 4:
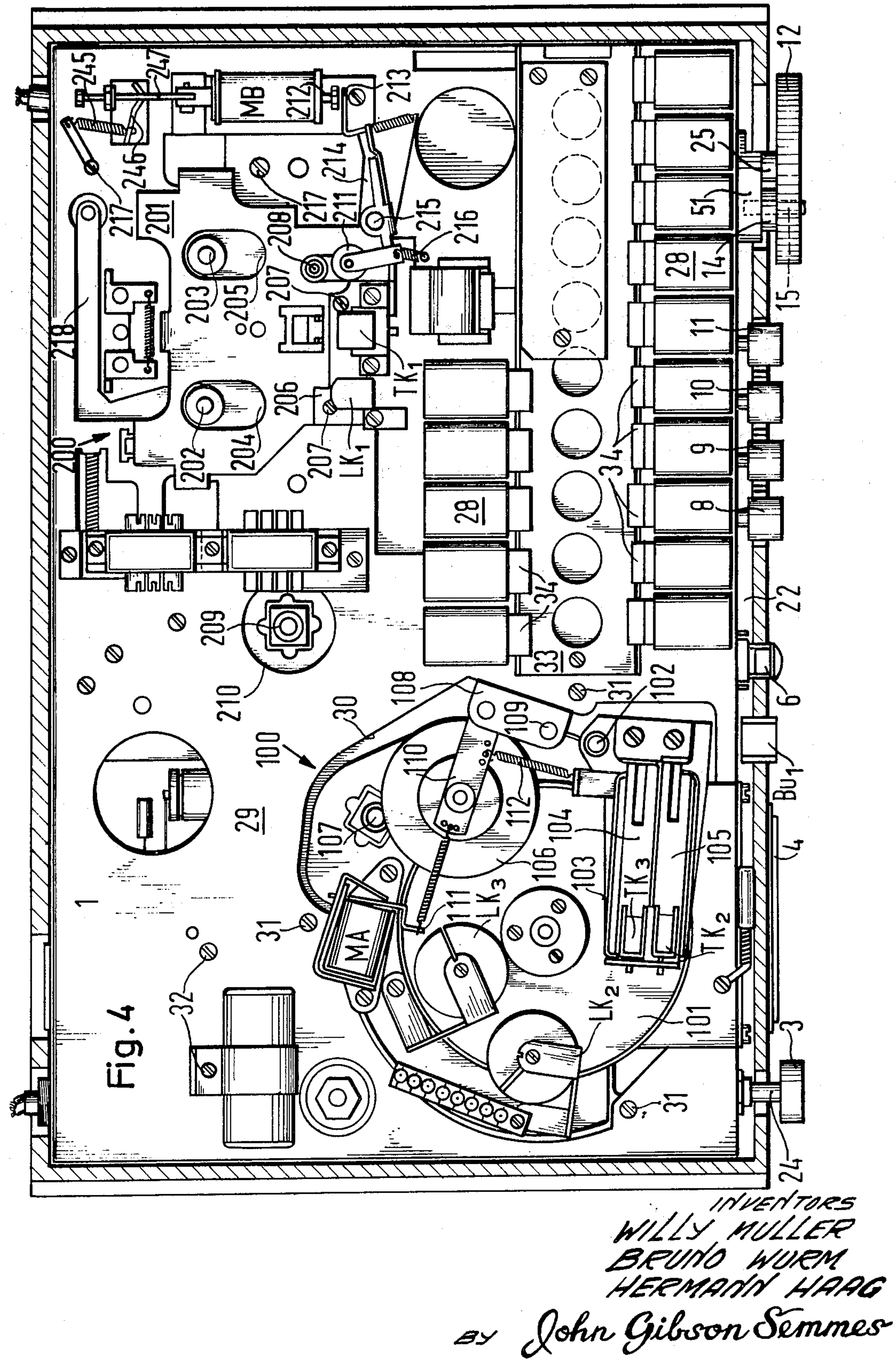
FIG. 4 is a top plan view of the chassis of the device, removed from the housing indicating internal features of the device.
Figure 5:
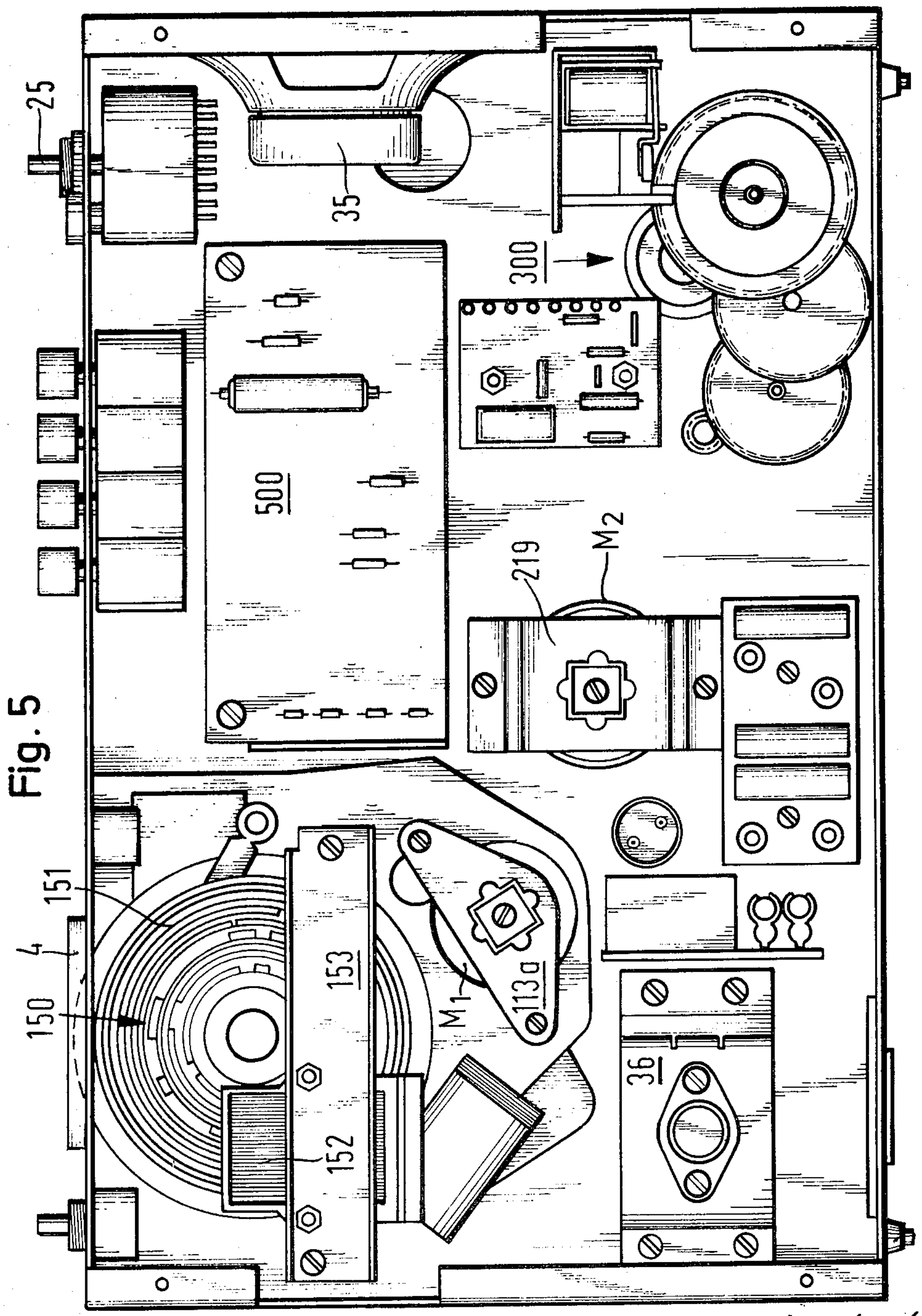
FIG. 5 is a corresponding plan view of the chassis from below.

The following is a description of parts of the device as shown in FIGS. 4 and 5 which are a plan view and a view from below of chassis of the device which carries the main mechanical and electrical parts, so as to provide a general picture of the internal construction of the device.

As can be seen in detail from the plan view of FIG. 4, the chassis plate 29 carries the answering unit which is combined with the control unit, both being denoted by reference numeral 100. This group of components extends upwards through a suitable hole 30 cut in the chassis plate and is attached by a number of screws 31. In the left upper part of the chassis plate 29 attachment screws 32 can be seen in FIG. 4 for the line transformer Tr1 (see also FIG. 17) arranged below the chassis plate.

To the front of the right-hand part of the chassis plate 29 there is a rail 33 to which the bases 34 of a series of relays 28 are attached.

To the rear of the right-hand part of the chassis there is the tape recording unit denoted by general reference numeral 200. This tape recording unit serves as a means for storing, that is to say recording, incoming telephone calls. The tape recording unit 200 will be described below with reference to FIGS. 10 to 12. As can be seen from FIG. 4 a deck plate 201 is mounted on the upper face of the chassis plate which serves as a base for a tape cartridge (not shown in FIG. 4) which can be placed on the spindles 202 and 203 of the tape turntable projecting upwards from below. The spindles 202 and 203 extend through slots 204 and 205 of the plate 201 upwards. On the plate 201 there is a further plate 206 which is held in position by means of screws 207 so as to serve for carrying the erase head LK1 and the magnetic head TK1 of the tape recording unit. 208 denotes capstan driven via a belt by the motor M2 which can be seen from opening 210 in the chassis plate 29. The tape is pressed by a pivotally mounted jockey roller 211 against the capstan when the tape magnet MB is actuated so that its downwardly acting armature 212 strikes the extension 213 of the pivoting lever 214 and swings the latter together with the jockey roller 211 carried by it about the pivot axis 215 against the action of spring 216. Owing to the pressing of the tape by means of the jockey or pressing roller 211 against the capstan 208 the tape is moved for recording operation of the tape recording unit 200. Reference numeral 217 denotes attachment screws for mounting the tape recording unit on the chassis plate 29. Reference numeral 218 denotes a part of a swinging lever linkage which is also operated by the tape magnet MB. The function of the linkage will be described below as a part of the detailed description of the tape recording unit referring to FIG. 10.

The combined answering and control unit 100 will be described in detail below. The plan view of FIG. 4 shows the magnetic heads TK2 and TK3 for the recording of the telephone answering text and the code text. The figure also shows the corresponding associated erase heads LK2 and LK3. The magnetic heads and the erase heads are arranged above the disc-shaped magnetic recording carrier 101 which in its radially inner part serves for recording the code text (see part II of the indicating scale as shown in the developed view of figure 20) while in its outer radial part it serves for recording the actual answering or announcement text (comprising a message proper, an indication that the caller should speak, a confirmation that recording has been carried out, and closing words, see part I of the developed view of the scale in accordance with FIG. 20). The magnetic heads TK2 and TK3 are held by means of adjustable holding means 104, 105 on a plate 103 in the form of a pivoting lever which can swing about a pivot axis 102. The adjustable holding means 104, 105 are as described in my earlier application Ser. No. 775,488 of 11-13-68 now U.S. Patent No. 3,597,545, The pivotal movement of the carrying plate 103 for the recording heads is brought about by cam control means, to be described below, in such a manner that both recording heads follow spiral sound tracks on the magnetic carrier 101 for recording and playback respectively. The drive of the magnetic carrier disc 101 includes a stepped friction wheel 106 having a large step making frictional engagement with a drive motor shaft 107 while the smaller step, not shown in FIG. 4, is in frictional engagement with the periphery of the magnetic carrier disc 101. The stepped frictional wheel 106 is mounted for rotation in a swinging carrier 108, 110 which in turn pivots about an axis 109 in response to the energization of a drive magnet MA which moves its armature 111 against a biassing spring 112 extending between the arm 110 of the swinging carrier 108 and the swinging plate 103 of the recording head holding means. This spring forms a common resilient means for both pivoting parts. In the energized condition of the magnet MA the larger friction wheel step 106 is in frictional engagement with the motor shaft 107 as shown and the underlying smaller frictional wheel step is in frictional engagement with the outer periphery of the carrying disc 101. As regards further details of the answering unit and the control unit cooperating with it, not shown in FIG. 4, reference is made to the detailed description referring to FIGS. 6 to 9.

FIG. 5 is a view from below of the chassis of the device. On the top left-hand part of FIG. 5 the control unit, denoted by general reference numeral 150 is shown. This unit is mounted under the chassis plate 29 below the answering unit 100 (FIG. 4). In FIG. 5 the lowermost control contact track disc 151 of the control unit 150 can be seen. The contact tracks cooperate with control contacts (*mc*1–*mc*4, *m*3 and *m*9, see FIGS. 17 and 21) held in a contact holder 152 which in turn is mounted in a bracket 153. Reference numeral 113*a* denotes a holding lug for the drive motor M1 (see FIG. 17).

Reference numeral 219 denotes the holding lug for the drive motor M2 of the tape recorder unit 200.

To the bottom right of FIG. 5 the marking drive, denoted by general reference numeral 300, is visible. It is arranged below the tape recording unit 200 and cooperates with it. The marking drive, which will be further described below with reference to FIGS. 13 and 14 in detail, serves for locating the beginning of the tape and the end of the recording on the tape in the tape recording unit in such a manner that, in response to remote control of the device for playback of recorded messages, the device is automatically run at a rapid return speed as far as the beginning of the tape and during forward movement of the tape at the normal playback speed the end of the messages on the tape can be located.

Reference numeral 35 denotes a loudspeaker of the device for internal operation of the device. The loudspeaker is arranged on the side wall of the chassis.

To the bottom left of FIG. 5 there is a holding lug 36 for line transformer Tr1 (see FIG. 17) together with associated circuit elements of the line power pack. As indicated towards the top central part of FIG. 5 the device comprises conducting plates of the electrical circuit parts of the device, these parts being denoted by general reference numeral 500, see also FIGS. 17 to 19. Further electrical circuit elements and circuit units are also visible in other parts of the lower view of FIG. 5. These parts do need to be described in detail at this point since the electrical circuit of the device will be described in detail with reference to FIGS. 17 to 19 below.

ANSWERING UNIT AND CONTROL UNIT

Figures 6, 7:
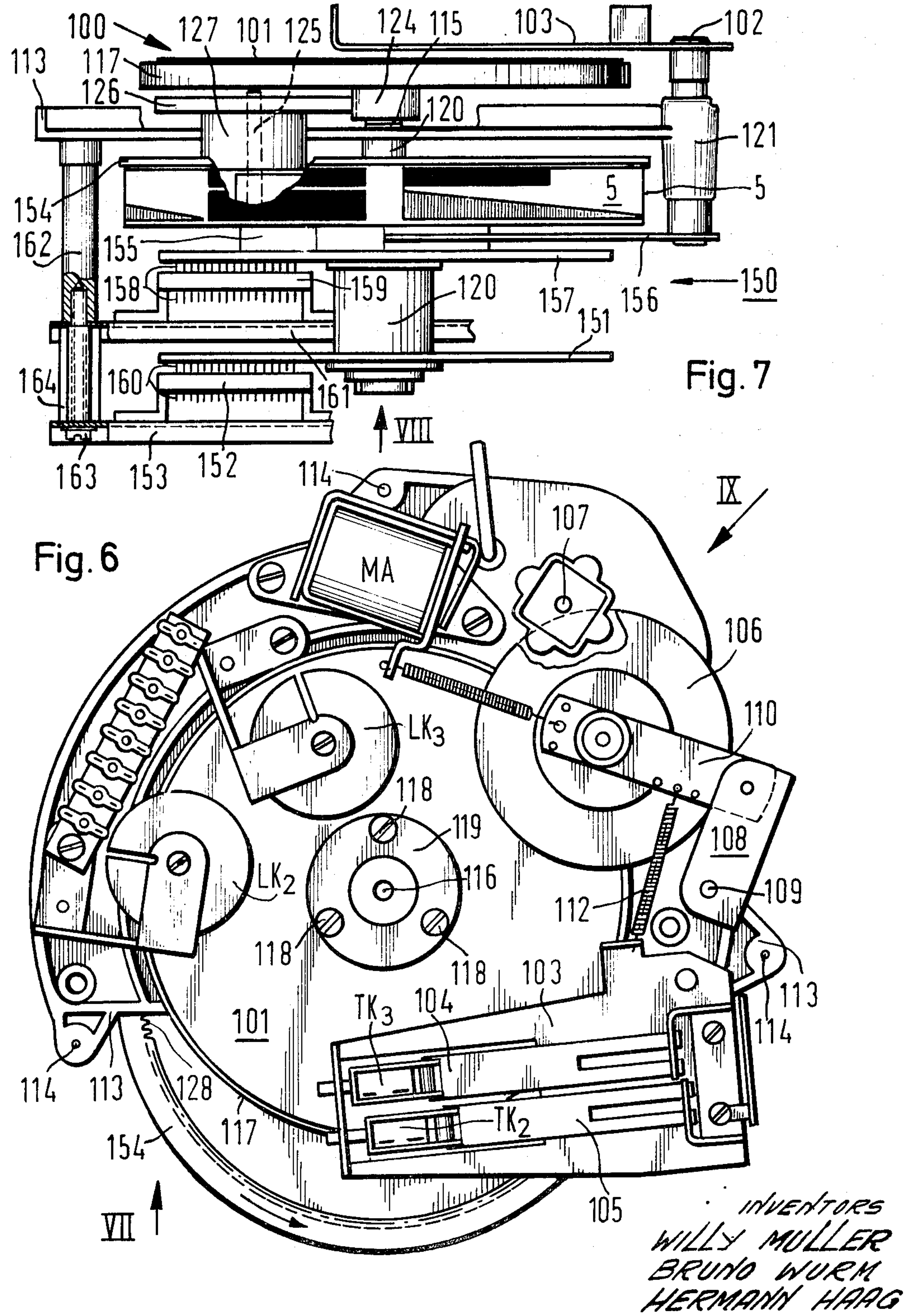
FIG. 6 is a plan view of the combined answering and control unit.
FIG. 7 is a side view of the answering and control unit as seen from the front of the device.

In what follows the answering unit, denoted by the general reference numeral 100, will be described with reference to FIGS. 6 to 9 together with the cooperating control unit 150. FIG. 6 shows the answering unit in plan view, FIG. 7 in side view and partial section of the component group looking in the direction of the arrow VII of FIG. 6, and FIG. 8 from below to shown the control unit 150 looking in the direction of the arrow VIII of FIG. 7 while FIG. 9 is a detailed view of the drive motor and the friction wheel drive for the answering unit and control unit, looking in the direction of the arrow IX in FIG. 6.

The combined answering unit and control unit comprises a cast frame 113 which has threaded holes 114 for receiving attachment screws 31 (see FIG. 4) for the attachment on the chassis plate 29. In a bearing 115 (FIG. 7) of the injection-molded housing 113, fixed to the chassis, the shaft 116 of the carrier turntable 117 is journalled. On its upper surface it carries the disc-shaped magnetic carrier 101 which is fixed by means of a disc 119 and three screws 118 on the turntable 117 so that it can easily be replaced.

The shaft 120 of the control unit 150 is also journalled in a bearing in the cast frame. This shaft carries a turntable wheel 154, which carries the indicating scale 5 (see FIG. 1 and the developed view of FIG. 20) on its external periphery and a cam disc 155, which controle via a follower lever 156 the pivotal movement of the pivoting plate 103 (see FIG. 4), carrying the heads TK2 and TK3, about a pivot axis 102 journalled in a further bearing 122 in the cast frame. The turntable 154 and the cam disc 155 rotate together. Furthermore the shaft 120 of the control unit 150 carries two control contact track discs 157 and 151, of which the disc 151 can be seen from below in FIG. 5 and in FIG. 8 with the contract tracks on it. Two contact spring sets 158 and 160 cooperate respectively with the two control contact discs 157 and 151. The contact spring sets 158 and 160 are mounted in holding means 159 and 152 which are arranged in turn in carriers 161 and 153 attached by means of brackets 162 to the cast frame 113 by means of screws 163. Between the carrying rails 161 and 153 there are spacing sleeves 164. As can be seen more especially from FIG. 6, the turntable 117 with the carrier 101 on the one hand and the control unit with the turntable disc 154 and the underlying control contact discs 157 and 151 on the other hand are not arranged concentrically since the shafts 115 and 120 of the answering unit and the control unit are offset from one another.

The drive of the control unit 150 (with the control contact discs 151, 157 turning together and the scale disc 154) is ensured by a stepdown transmission driven by the turntable 117. This transmission comprises the following parts: pinion 124 on the hub of the turntable 117; stepped gear wheel 125, whose large step 126 meshes with gear wheel 124 and whose small step 127 meshes with the internal gear 128 (see FIG. 6) of the scale disc 154. The step down ratio is so chosen in the embodiment of the invention described that for one rotation of the control unit (scale disc 154 with control contact discs 151 and 157), which corresponds in a complete cycle of functions of the device, there are 12 rotations of the turntable 117 with the magnetic carrier 101. In these 12 rotations the heads TK2 and TK3 of the answering part and code part play back the corresponding tests (the answer text and code text, see sections I and II in FIG. 20) to the caller. It is also possible, alternately, during these 12 rotations to record these texts by means of the heads TK2 and TK3.

The drive of the whole unit is ensured as is shown in detail in FIG. 9, that is to say the answering unit motor M1 drives the large friction gear step 106*a* in the drive position (that is to say with the magnet MA in the energized state) against the motor shaft 107 of the motor M1 while the small step 106*b* is in frictional engagement with the outer periphery of the turntable 117 and drives it and thus also simultaneously drives the above-mentioned stepdown transmission so as to cause the control unit 150 to function. FIG. 9 also shows in detail the pivotal holding means for the stepped frictional wheel 106, including the two-part pivoting carrier 108, 110 whose part 110 journals the shaft 129 of the stepped frictional wheel 106; the pivot shaft 109 of the pivoting carrier holding means 108, 110 is carried in a further bearing 130 of the cast housing 113. Reference numeral 113*a* shows the holding lug or strap for the drive motor M1 which is attached by means of brackets 131 to the cast frame 113.

The overall construction of the answering unit 100 and the control unit 150, more particularly as regards the adjustable holding means for the heads TK2 and TK3, the construction of the magnetic carrier disc 117, 101, and as regards the construction of the control contact discs 151, 157, is as in the previous application Ser. No. 775,488 of 11-13-68, now U.S. Pat. No. 3,597,545, the only difference being that in the previous arrangement only a single recording and playback head an a single erase head were necessary as no code part was required. There is also only a single control contact track disc.

STORAGE UNIT (TAPE RECORDER UNIT)

Figure 10:
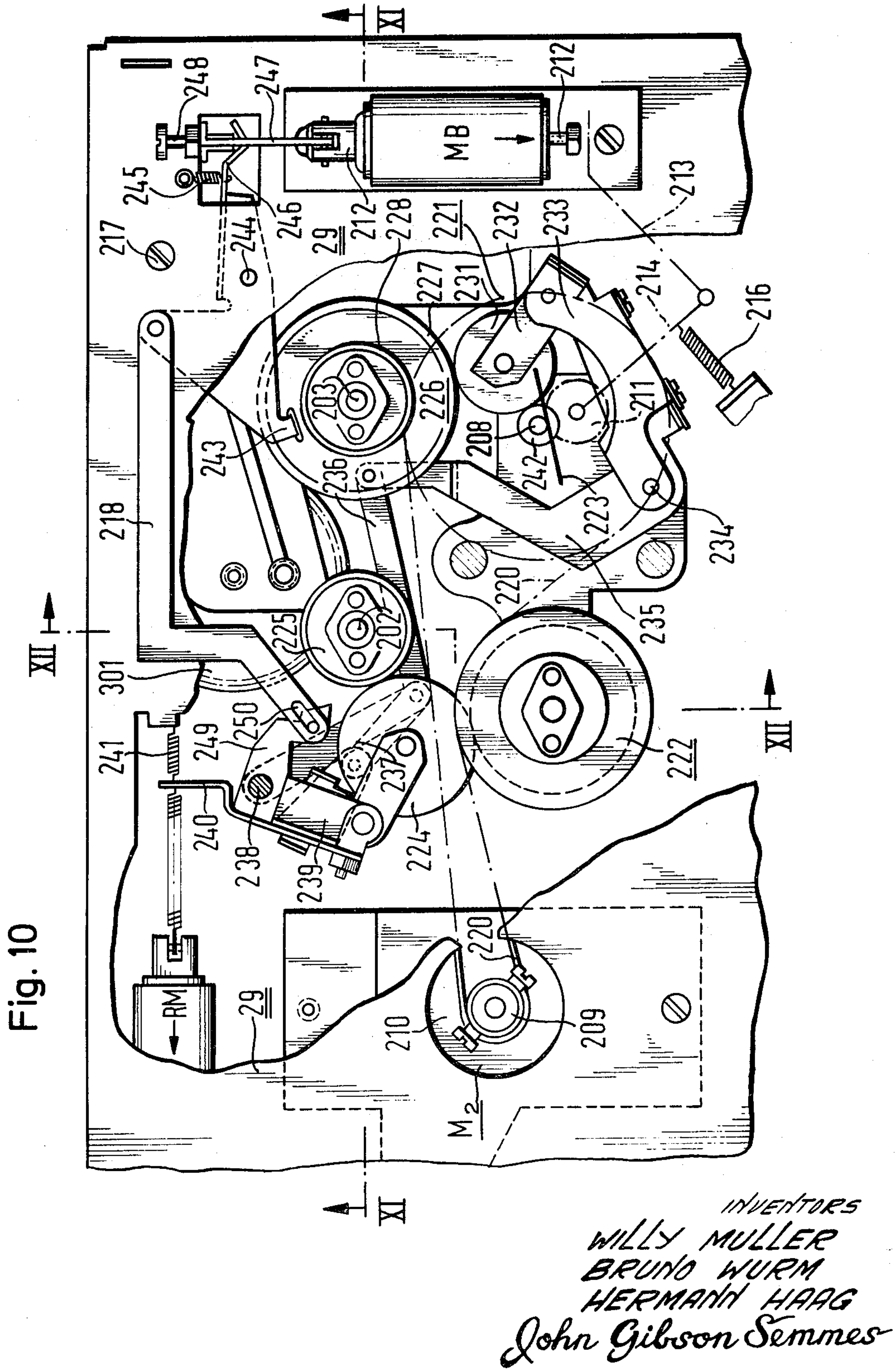
FIG. 10 is a plan view of the tape recorder for recording messages, parts of the chassis plate being broken away.
Figure 11:
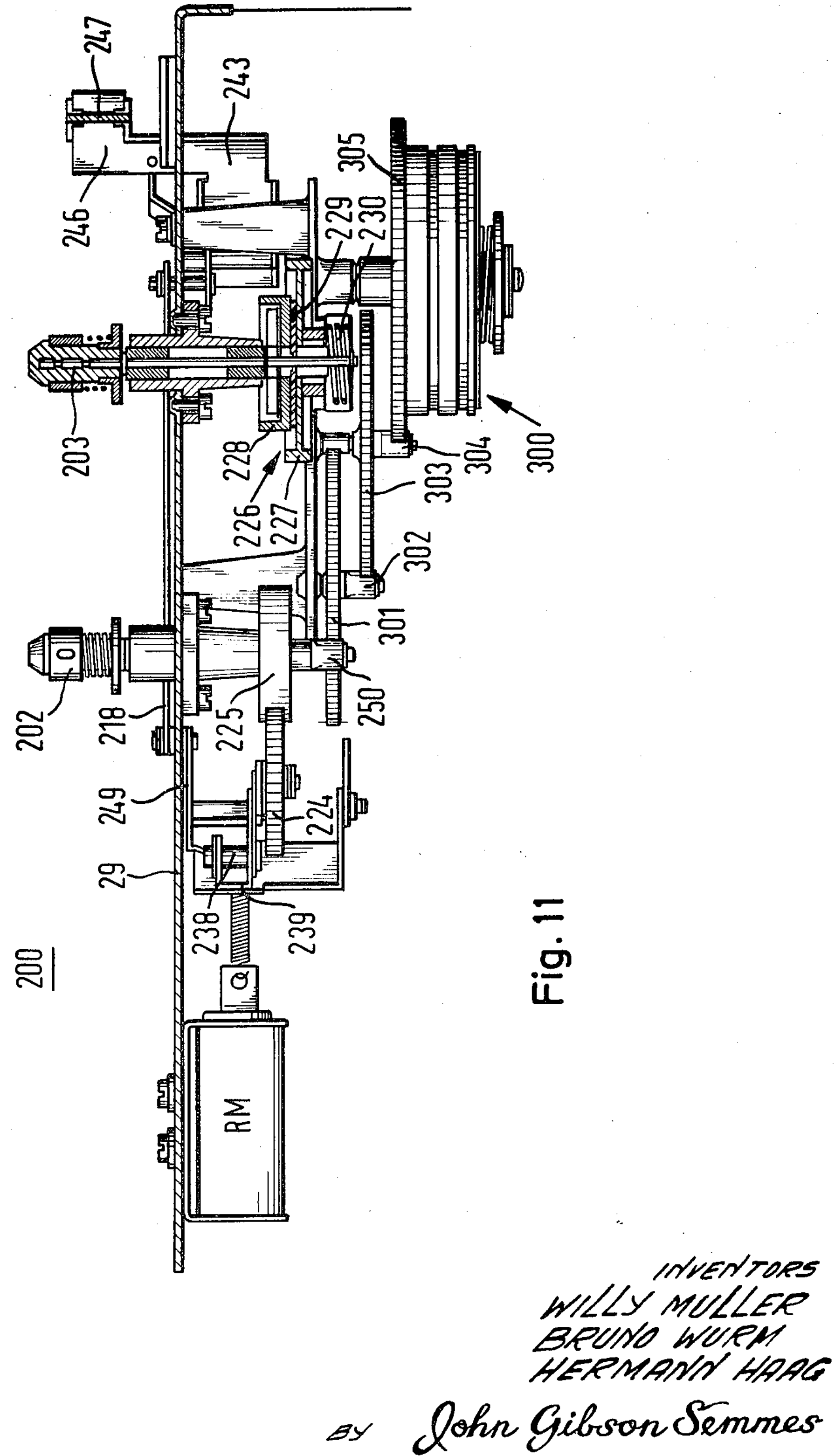
FIG. 11 is a section through the tape recorder on the line XI—XI of FIG. 10.

There now follows a description, referring to FIGS. 10 to 12, of the storage means for recording telephone messages received and for internal operation for recording any desired messages. This storage means or unit is denoted by reference numeral 300 (see FIG. 4). The storage means substantially comprises a conventional tape recorder unit for tape cartridges, though in the present case considered there is no need for a rapid travel of the tape in the forward direction to be provided. The tape recorder therefore only has the normal forward travel speed for recording and playback, and a rapid tape reverse facility. In the general plan view of FIG. 10 the deck plate 201 (see FIG. 4) has been omitted in order to render the drawing readily intelligible and the chassis plate 29 has been largely broken away, as is shown in FIG. 10. Furthermore of FIG. 10 the erase head and the recording/playback head are omitted in order to facilitate understanding of the arrangement. FIGS. 11 and 12 are sections on the lines XI—XI and XII—XII respectively of FIG. 10.

The drive motor M2 of the tape recorder unit having a drive shaft 209 drives, via a belt 220 (see FIG. 10, in which the further course of the belt 220 is only shown in broken lines in FIG. 10) the flywheels 221 and 222. The flywheel 221 only serves for forward tape movement (that is to say slow tape movement) and coaxially carries the upwardly extending capstan 208. The capstan 208 ensures that the device runs evenly and is responsible for tape transport during slow forward movement of the tape. For this purpose it cooperates with the jockey roller 211 which in FIG. 10 is only shown in broken lines. The jockey roller is pressed towards the capstan 208 by means of the pivoting lever linkage 213, 214 when the tape magnet MB is energized and attracts its armature 212 against the biassing spring 216. When the jockey roller 211 is moved in this manner the magnetic tape (indicated by reference numeral 223 in FIG. 10) is entrained through the nip of the jockey roller 211 on the capstan 208. The bob weight or flywheel 222 serves in this case only for rapid return tape transport. This transport is ensured by means of the return or reverse wheel 224 at the winding station 225 (with the upwardly projecting spindle 202, see also FIG. 4). The winding up or take up station is denoted by general reference 226 and takes up tape 223 transported by the capstan 208 (in the forward run position). The take up station 226 comprises a lower larger step 227 and an upper smaller step 228, there being a driving connection between the two by means of a slipping clutch 229 with a loading spring 230. The upper smaller step 228 of the take up station 226 carries the spindle 203 extending upwards to a level above the chassis 29 and the deck plate 201 (see FIGS. 4 and 11). the spindle 203 comes into engagement with the take up spool or bobbin when a tape cartridge is placed in position. The take up station 226 is driven on its larger step 227 during advance movement by an intermediate wheel 231; this wheel 231 is carried in a swinging frame or carrier 232 which pivots about an axis 234 and is connected by means of a lever linkage 235, 236, 237 with the pivoting link 239 of the reverse intermediate wheel 224. The link 239 pivots about an axis 238 and can be pivoted by means of an arm 240 against a biassing spring 241 when the reverse magnet RM is actuated. In the non-energized position of the reverse magnet RM the pivoting link 239 of the reverse intermediate wheel 224 is swung in a clockwise direction (in terms of FIG. 10) about the pivot axis 238 in such a manner that the reverse intermediate wheel 224 is out of engagement with the reverse flywheel 222 and the take up station 225; simultaneously, in this normal position, the pivoting lever 233 of the advance movement intermediate wheel 231 in the clockwise direction as well in such a manner that the advance intermediate wheel 231 is in frictional engagement with a small step 242 of the advance flywheel 221, on the one hand, and with the large step 227 of the take up station 226, on the other hand, so that the take up station is driven. In the resting position a brake 243 acts on the large step 227 of the advance take up station 226, that is to say when both the advance magnet MB and also the reverse or return magnet RM are not energized. The brake 243 is in the form of a pivoting lever which pivots about a pivot axis 244 and is biassed into the braking position on the take up station 226 by a biassing spring 245 in an anticlockwise direction. The actuation by the advance magnet MB is due to an extension 246 of the pivoting brake 243 which is connected with a rod 247 which in turn is connected with the armature 212 of the forward run or advance magnet MB. By means of a setting screw 248 the point of engagement between the pivoting brake 243, 246 and the rod 247 of the advance magnet MB can be adjusted. The actuation from the side of the return magnet RM is carried out by means of the linkage 218 (FIG. 10, see also FIG. 4), which is connected at one of its ends with a lever arm 249 of reverse intermediate wheel pivoting lever 239 via a slotted connection while its other end is connected with the pivoting brake 243.

In what follows the manner of operation of the tape recorder unit will be described in various functional states.

"Stop" position: In this position, in which neither magnet MB and RM is not energized, the return intermediate wheel 224 is held by the spring 241 out of engagement with the return flywheel 222 and the winding station 225. The pivoting brake 243 is held pressed by the spring 245 against the large step 227 of the take up station 226. The intermediate wheel 231 is held by the biassing spring 216 in position between the advance flywheel 221, that is to say its smaller step 242, and the take up station 227.

In the "normal run" position for recording or playback the advance magnet MB is excited; this on the one hand releases the brake 243 so that the take up station 226 can transport the tape via the slipping clutch 229, while on the other hand the jockey roller 211 is pressed by magnet MB against the capstan 208 so that tape transport occurs.

In the position for rapid tape return the return magnet RM is energized; this causes the return intermediate wheel 11 to be pressed into engagement with the return flywheel 222 and the take up station 225 so that the latter is caused to be driven for rapid return; simultaneously the pivoting brake 243 is brought out of operation via the linkage 249, 218. Furthermore the linkage 237, 236, 235 swings the pivoting lever 233 of the advance intermediate wheel 231 in a clockwise direction that the advance intermediate wheel 231 is brought out of engagement with the take up station 226.

Simultaneous engagement of the return intermediate wheel 224 by the linkage 218 in the "forward" position in which the forward magnet MB is energized is prevented by the slotted connections 250 between the pivoting lever arm 249 and the linkage 218.

In the side and sectional views of FIGS. 11 and 12 the lower part of the marking drive, denoted by general reference numeral 300, is shown. This drive is connected with the lower side of the take up station 225 via a three-wheel gear wheel step down transmission 301 to 305 with a small gear wheel step 250. The marking drive 300 in accordance with the invention is described in detail in what follows.

THE MARKING DRIVE

In what follows the marking drive is described with reference to FIGS. 13 and 14. The drive serves to locate and record the beginning of the tape and the end of the tape of the tape recorder unit for control purposes and also fixes or marks the state of the recording in the tape recorder unit in such a manner that on remote control of the device taking place there is an automatic tape return movement as far as the beginning of the tape and then there is an advance movement of the tape so that playback is continued as far as the end of the last recording on the tape, the mechanism then being stopped in this position so as to be ready for recording further messages.

The marking drive 300 in accordance with the invention is driven via a gear wheel step down drive 301 to 305 which is in engagement with the winding station 225 with such a drive ratio that the range of rotation of the gear wheel 305 of about 350° corresponds to a passage of the whole tape of the tape recording unit. The gear wheel 305 entrains a clutch disc 307, constituting part of a slipping clutch, via frictional pad means. The clutch disc 307 is provided at its periphery with a projection 308 which cooperates with a fixed marking contact *mk* (see also FIG. 17). In the normal position the projection 308 of the slipping clutch disc 307 is held in the manner shown in FIG. 13*a* by means of a locking bolt 309 on the armature 310 of the marking magnet M (see also FIG. 17) so that there is a slipping of the clutch when the gear wheel 305 turns; in this position the marking contact *mk* closes so as to be in contact with the corresponding fixed contact 311. On energization of the magnet M, the armature 310 exerts a magnetic pulling action and the locking bolt 309 releases the projection 308 on the slipping clutch disc 307.

On the gear wheel 305, that is to say on its step 305*a* of reduced diameter, there is also a contact projection 312 in whose path of movement the moving contacts *ak* and *ek* of a fixed contact set 313 lie. The contact ak (see also FIG. 17) marks the beginning of the tape while the contact *ek* marks the end of it. In what follows the manner of operation of the marking drive is described: Starting from the initial rest position shown in FIG. 13*a*, in which the marking contact *mk* is closed by the projection 308 (itself locked by the locking bolt 309 of the magnet M) and in which the projection 312 holds the band start contact *ak* open, let it be supposed that, owing to a control function, the tape recording unit begins to run slowly in the forward direction for one or more message recordings; the contact projection 212 which is fixed to the gear wheel 305 moves in the direction of the arrow "V" (advance direction); the projection 312 actuates the tape start contact *ak* at the beginning and then moves during the course of further recordings successively in an anticlockwise direction onwards. The marking contact *mk* is locked on both sides, that is to say on the one hand by the fixed contact carrier 311 of the fixed contact and on the other hand by the lockin bolt 309 of the magnet M. During the course of recording the angular distance between projection 312 moving in an anticlockwise direction and the projection 308 which is held stationary constitutes a quantity which represents the amount of tape which has been used in the recording of messages.

If there is a changeover from the "recording" or "playback" mode of operation (in which the marking magnet M is not energized) to the "tape return" mode of operation, the gear wheel 305 is now driven by the tape recorder unit in the opposite, that is to say clockwise direction (arrow R). Simlutaneously the marking magnet M is energized so that the armature 310 with the locking bolt 309 attracts and comes out of the path of movement of the projection 308 of the clutch disc 307; in this manner the slipping clutch 307 is entrained in an anticlockwise direction by the gear wheel 305 in such a manner that the projection 308 moves in the direction of the arrow R during rapid tape return movement while at the same time the projection 312 moves in this direction of rotation. Arrival at the start of the tape is fixed or recorded by the actuation of the start contact ak by the projection 312 moving backwards. The rapid tape return travel is automatically stopped. The projection 308 has in the meantime moved through a distance corresponding to the whole length of the recording. In the following playback the gear wheel 305 is again driven in the advance direction "V" (by the tape recorder unit), the projections 312 and 308 moving correspondingly in a clockwise direction. Arrival at the end of the recording is fixed by the marking projection 308 coming to rest against the marking contact *mk* and pressing the latter so as to close against the fixed contact 311. In this position the projection 308 is again locked by the locking bolt 309 of the marking magnet M which it had previously passed.

In the manner described the marking drive in accordance with the invention ensures that the device brings about an automatic band return movement in response to remote control (or also in the case of internal operation) and then runs as far as the end of the recording for playback.

The projection 312 of the gear wheel 305 simultaneously serves for marking or fixing the end of the tape since it actuates the end contact *ek* on a full rotation of the gear wheel 305 (corresponding to the travel of the whole of the tape in the tape recording unit). The end contact *ek* is opened (see FIG. 17). This means that the storage capacity of the tape recording unit is fully used up and if the device remains set in the "-telephone operation" state or mode it can only be used for answering in coming calls without recording messages. In this respect attention is drawn to the detailled description of the function of the device below.

The marking drive in accordance with the invention constitutes a simple, reliable means for fixing or recording the start of a tape and the end of a tape and a marking of the length of tape which has been used up by the message or messages recorded.

THE MAIN SWITCH LOCK

In what follows the main switch lock will be described with reference to FIGS. 15 and 16. As mentioned initially the rotary knob 12 of the main switch S for selecting the mode of operation desired is provided with a lock 14 serving for locking the switch and provided with a key 15 for operating it.

As is apparent from the sectional view of FIG. 15, the lock 14 is mounted in the cylindrical knob 12 which is mounted on the spindle 25 extending through the front side of the device and serving for operating the main selector switch S. The key 15 of the lock can be moved through 90° in a clockwise direction and an in anticlockwise direction from its normal position.

The lock pin 50 which can be set by the key 15 cooperates with the fixed cast part 51 which is mounted on the front corner 22 of the chassis 29 so as to be concentric to the spindle 25 of the main selector switch. In FIG. 16 the cast part 51 or counter-abutment of the switch lock is shown looking in the direction of its axis, the various modes of operation of the main selector switch S being indicated with Roman numerals I to V in accordance with their angular positions. The counter-abutment 51 has two arcuate chambers 52 and 53 which are connected by a narrow passage 54. In the lower chamber 53 on the inner periphery there is a step 55. The lock pin 50 is shown in the various positions necessary for turning the main selector switch knob 12 through its full range of movement in FIG. 16. Starting at the position I of the main selector switch and from the normal position of the lock pin 50 in its radial direction, it is possible to move into the position II without altering the position of the lock pin 50; movement between the switch positions I and II is therefore not locked. However, in order to move from the switch position II into the switch position III, the lock pin 50 must be turned in a clockwise direction through 90° using the key 15 so as to come into a tangential position in order to be able to pass through the narrow passage 54 of the cast part 51. Movement between positions III and IV is again not locked; on the other hand for movement from switch position IV into the position V the lock pin must again be turned through 90° in an anticlockwise direction into a radial position. In order to move the knob 12 in the opposite direction (that is to say from position V into position I) the reverse movements of the lock pin 50 are brought about using the key 15. It should also be mentioned that the key 15 cannot be removed when the lock pin is in the tangential position.

The switch lock in accordance with the invention therefore ensures that it is not possible to play back recorded messages or to erase the message test which the device transmits to callers without a key.

THE ELECTRICAL CIRCUIT OF THE DEVICE

In what follows the electrical circuit of the device will be described with reference to FIGS. 17 to 19.

FIG. 17 shows a block circuit diagram, which has been simplified to a considerable extent, of the electrical overall circuitry of the device. The line-supplied power pack, denoted generally by reference numeral 501, receives the line voltage via an input transformer Tr1. The line transformer Tr1 has its primary connected with a line voltage selector switch for 110 and 220 volts. The line switch 502 of the device is actuated by the rotary knob 3 (FIG. 1) of the volume control. The power pack 501 provides supply DC voltages of +1 V and +2 V via lines 503 and 504 for the various electronic circuit components. Furthermore the power pack 501 supplies a drive AC voltage of 42 V at 505 for the drive motors M1 and M2 of the answering unit and the tape recording and storage unit; the power pack also supplies an output AC voltage of 18V at 506 for driving the erasing heads LK2 and LK3.

Furthermore the circuit arrangement includes a call circuit 507 which by means of a transformer Tr2 receives the call current from the wires T*a* and T*b* of the telephone channel and is connected at its output with a call relay AR so as to operate it. Furthermore a combined recording amplifier 508 with a limit circuit (described in detail below with reference to FIG. 19) is provided. The recording amplifier 508 is connected via the transformer Tr3 always connected with the telephone wires T*a* and T*b*. The transformer Tr3 forms a hybrid circuit with the transformer Tr2. The output of the transformer Tr3 is arranged to drive the head TK1 of the recording and storage unit for recording in coming telephone calls.

Furthermore there is a reproduction amplifier 509 whose input can be connected with the heads TK1, TK2, and TK3 and whose output can be connected with the output transformer Tr2 for the telephone lines T*a* and T*b*, via the switch connection W. For reproduction in internal operation an output amplifier 517 is provided arranged to drive the loudspeaker 35.

Furthermore the electrical circuit comprises a speech switch 510 whose input is connected with a filter 511; the speech switch 510 is connected with the input of a relay HR and responds via the filter circuit 511 at selected frequences in the case of remote control when the user of the device connected with it by a telephone connection intones the vowel "A" at the positions prescribed by the code circuit (see the description of the manner of operation of the device below). Furthermore the speech switch 510 causes a switching-off of the recording of a message from an incoming call when the caller makes a long pause, for example 6 to 8 seconds. The drive circuit for the relay HR is in the form of a delay circuit operated by a timing means, the time constant for the function of speech interruption during speech recording being capable of being extended by contacts *x*12–13 in relation to function in a case of code remote control, for example to the given value of 6 to 8 seconds as compared with a value of 2 seconds in the case of code remote control.

Furthermore there is a flashing circuit 512 together with a timing circuit 513. The flashing circuit only comes into operation in the case of internal reproduction of recorded messages and in the case of simultaneous operation of the stop button for operation for the indication, in the case of internal message playback, that messages have been recorded. The time switch 513 has its output connected with the input of a relay Z which in telephone operation limits the message recording to a pre-determined maximum duration, that is to say in accordance with a fixed time device. The duration can be set by the user of the device within certain limits, for example between 1 and 2 minutes.

Furthermore one of the essential parts of the circuit is a relay part 514 and a code switch 515 which are shown in full detail, substantially, in FIG. 17.

The relay part 514 includes the magnets for the answering unit, the tape recorder unit, and for the drive, that it to say the magnet MA for driving the answering unit, the magnet MB for the jockey roller of the tape recording unit, the magnet RM for rapid reverse travel of the tape recording unit, and the magnet M of the marking drive (see FIGS. 13 and 14). Furthermore the relay circuit includes a series of relays AH, D, LR, G, K, U, X, and S of which the relays D and G are polarized relays with two input or energizing windings. Furthermore the relay part includes the following contacts of the control circuit unit: *m*1, *m*2, *m*3, *m*4, 5*a*, *m*5*b*, *m*8. Furthermore the relay part 514 includes the contacts *ak* and *mk* of the marking drive (see FIGS. 13 and 14); finally the relay part includes the various pushbuttons for internal operation of the device (see the four pushbuttons on the front side in FIG. 1) the symbols used for indicating them being given in FIG. 17*a*.

Furthermore the relay part includes a series of diodes D1 to D17 and a number of contacts of the above-mentioned relays. A HF generator 516 produces the HF pre-magnetization for the head TK1 of tape recorder unit and simultaneously the erase current for its erase head LK1.

Reference numeral 516*a* denotes a current limiting circuit for the energizing current circuits of the individual magnets MA, RM, MB, and M.

The code circuit 515 includes the push button switch unit, provided at the rear side of the device (see FIG. 2) which includes the code pushbutton C and four code number pushbuttons 1, 2, 3, and 4 for setting the desired code for remote control; furthermore the code part 515 includes a code relay CR, "false" relay F and a "correct" relay R which are operated in the case of false and correct remote control in accordance with the code set.

Furthermore the code part 515 includes the control contacts *mc*1, *mc*2, *mc*3, and *mc*4 associated with the code number pushbuttons 1 to 4, forming part of the control unit. The code part 515 also includes the further control circuit units *m*6 and *m*7 and three diodes D18, D19, and D26.

Reference numeral Bu1 denotes the microphone plug socket on the front side of the device for connection of the microphone for making recordings on the tape recorder unit. Reference numeral Bu2 denotes a microphone socket arranged on the rear side of the device (see FIG. 2) for the use for recording and checking the answering text for the answering unit. In both cases the contacts 3 and 4 of the microphone sockets are closed, when the microphone is plugged in, by the start pushbutton of the microphone.

The various contact planes and contacts of the main selector switch are denoted by reference letter S in FIG. 17, the control contacts of the control unit being denoted by *m* and *mc* and the relevant numbers. Capital letters A, B, H, M, and W included in circles denote circuit connections between various points of the circuit.

Figure 8:
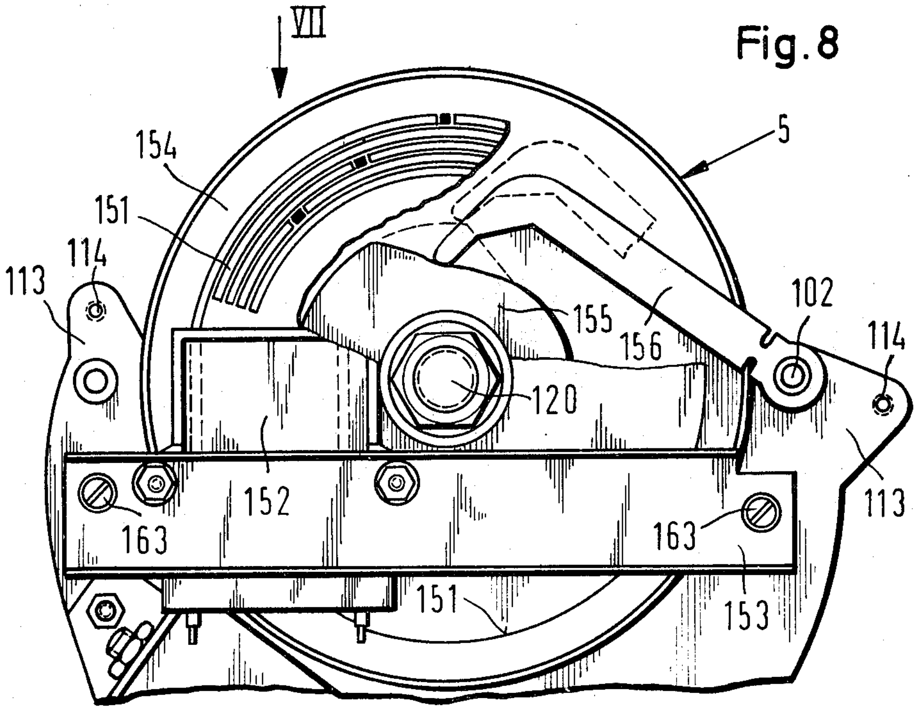
FIG. 8 is a view of the control unit from below, parts being omitted or broken away for purposes of clarity.
Figure 9:
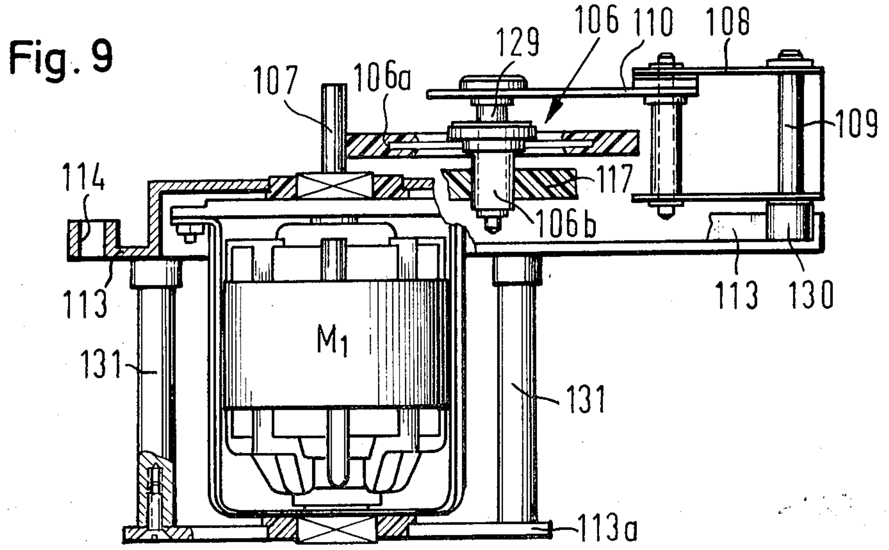
FIG. 9 is a partially cut away side view of the motor drive for the answering and control unit.

FIG. 8 is a detailed circuit diagram of the circuit groups 510 (speech switch), 511 (filter circuit), 512 (flash generator), and 513 (time switch) as used in FIG. 17.

The time switch consists substantially of a multi-vibrator stage with a unijunction transistor T1 and a driving stage T2 which is driven by the multivibrator stage and serves for operating a relay Z in the output circuit. The relay stops recording of a message after a given maximum duration corresponding to a fixed time, as has been mentioned above. The time switch is started by the contacts *x6* and *x7* when the relay X is actuated so that the relay Z is energized; after the expiry of the time constant (which can be adjusted) the stage T1 is actuated and causes the relay Z to be released via the driving stage T2.

The flash circuit 512 is provided in a similar manner with an unijunction transistor stage T3 connected with the driver stage T4 whose output circuit includes the flashing lamp La6.

Speech currents from the telephone line are amplified by a recording amplifier 508 and fed to the input at A of the filter circuit 511. The amplified speech currents are supplied via a first discriminating stage T7 to the actual filter FF. The output of the filter circuit is formed by a transistor stage T9, arranged to run as an emitter follower, with a gain less than unity.

The speech switch 510 comprises two transistor stages T10 and T11 operating as pulse formers, in which the sinusoidal signals are converted into rectangular pulses. These are supplied via a coupling and differentiating transistor C115 to the base of a transistor T13 operating as a current amplifier and directly coupled with the base of the relay driving stage T16 for the relay HR. The regenerative coupling via the transistor T15 and the diode D24 serve for bringing about a rapid switching response of the driving transistor T16 even in the case of narrOw pulses. On the other hand the control contact *m*10 (see the contact diagram of FIG. 21) serves to ensure that the relay HR is opened via the transistor T12 in every case, that is to say when for instance the A vowel is intoned for a long time by the user of the device. As already mentioned during the period in which the control contact *m*3 is closed (that is to say during the recording of an incoming telephone message) the contact *x*12–13 and a condenser C116 to cause the opening time of the relay HR to be increased to a value of for example 6 to 8 seconds, as opposed to 2 seconds in the case of code operation during remote control.

FIG. 19 is a detailled view of the combined recording amplifier with limiting circuit 508 as shown in FIG. 17. As is apparent, this part of the circuit consists of the amplifier 508*a* proper and the volume limiting circuit 508*b*.

The amplifier 508*a* is in the form of a triple stage tranSistor amplifier T19, T20, T21. The microphone currents from the socket Bu1 and from the socket Bu2, as the case may be, are fed to a first input 518 which is connected by a coupling condenser C121 with the input circuit of the first transistor stage T19. For these currents a gain is required which is high in comparison with the gain for speech currents arriving via the telephone line. The latter speech currents are fed to the amplifier at a second input conductor 519 from the Post Office transformer Tr2 so as to arrive at the second stage T20 of the amplifier since for these speech currents less gain is needed than is the case with microphone currents.

The limiting circuit 508b has the task of limiting the signal level at output A of the recording amplifier 508*b* to a maximum value in order to ensure that there is a constant recording magnitude for a given input signal level and to avoid saturation. Circuits, in particular automatic control circuits for decreasing the amplification factor and an increase in signal amplitude are known as such. They generally employ a modification of the input resistance, that is to say the operating point of the amplifier. This, however, brings with it a danger of distortion of the signal since the DC setting becomes displaced on an increase in the signal voltage level into the curved part of the characteristic of the amplifier, for example a transistor amplifier. The volume limiting circuit in accordance with the present invention ensures that there is the desired degree of limitation of the output signal level to a pre-determined maximum value without any substantial modification of the DC setting of the amplifier, that is to say without any displacement of the working point by the regulating action. The limiting circuit comprises a transistor T23 which constitutes a controlled variable resistance connected in parallel with the input line 519 between the first transistor stage T19 and the second transistor stage T20 of the amplifier. The point of connection of the transistor T23 in the coupling line between he two amplifier stages T19 and T20 is blocked as regards DC signals by condensers C124 and C126. The emitter-collector path of the transistor T23 of the limiting circuit thus forms a controlled variable parallel resistance for the AC current signal to be amplified without the DC setting of the amplifier being changed. The conductivity control of the regulating transistor T23 is carried out via a second control transistor T24 of the limiting circuit 508*b*, whose base receives a signal from the output A of the amplifier 508, this signal having a magnitude proportional to the output signal. In the embodiment shown a part of the amplifier output signal defined by the voltage divider resistances R142, R141 is supplied to the control resistor T24 run in an emitter-base circuit, via a coupling condenser C137. The collector of the control transistor T24 is connected with the positive supply voltage of +2 volts via a pre-resistance R140. The emitter of the control transistor T124 is connected with the base of the regulating transistor T23. Connected across the collector-emitter path of the control transistor T24 there is also a condenser C135. A further condenser C134 is provided between the base of the regulating transistor T23 and ground.

The operation of the volume limiting circuit 508*b* is as follows: The signal supplied from the output A of the amplifier 508*a* to the base of the control transistor T24 is rectified in the control transistor T24 and the same control magnitude is fed to the base of the regulating transistor T23, whose conductivity can be changed in accordance with variations in the output signal level of the amplifier 508*a*. By suitably chosing the values of the resistances R142 and R141 a precise response threshold can be obtained. By suitable dimensioning of the circuit parameters the required degree of regulation can be achieved in a simple manner with each type of amplifier. By suitable dimensioning of the capacitors C135 and C134 the constants of regulation can be chosen to meet individual requirements.

The above-described limiting circuit 508*b* brings about an effective regulation of the amplifier 508*a* to a practically constant signal output voltage, independently of variations in the input signal level and/or of variations in the supply current etc.

It is again stressed that the above-mentioned limiting circuit 508*b* is not limited to application to the present telephone answering device. The limiting circuit in accordance with the invention is suitable for all applications where the avoidance of saturation of an amplifier is necessary. For example the invention can be used with advantage in amplifier circuits used for high quality reproduction of music, for which the avoidance of any saturation is essential in order to ensure that there is a particularly low non-linear distortion factor.

The volume limiting circuit of the invention is moreover not only suitable for use in multistage amplifiers in which it preferably acts at the connection between two following amplifier stages; in principle the limiting circuit can also be used for single stage amplifiers in which the regulating circuit actuated from the output of the amplifier acts on the input of the amplifier. It is also to be mentioned, finally, that the above-desired limiting circuit is also not limited to the regulation of amplifier circuits so as to achieve a constant output volume level. With a suitable modification of the control circuit for the regulating transistor T23 the limiting circuit can also be used for a different regulation of the amplifier in accordance with any other function as may be required in accordance with the amplifier output signal in question. Furthermore the described limiting circuit can also be used for any form of amplification control required, that is to say for an arbitrary influencing of the amplifier, independently of the output signal in question.

MANNER OF OPERATION OF THE DEVICE

In what follows the manner of operation of the device is described in its various modes of function, reference being had to the block circuit diagram of the circuit as a whole shown in FIG. 17, taken in conjunction with the developed view of FIG. 20 of the periphery of the indicating scale on the periphery of the indicating disc of the control unit, and also in conjunction with the time diagram, shown in FIG. 21, of the operation of the individual switching contacts of the control unit during the course of a functional cycle.

At first a summary is made of the function of the device with reference to the indicating scale of FIG 20. FIG. 20 shows the indicating scale mounted on the periphery of the indicating disc of the control unit, a single passage of the scale (corresponding to a rotation of the indicator disc of the control unit) corresponding to a complete functional cycle of the device. The indicating scale has a broader lower range or part I and a narrower upper range II. The range I serves for indicating the course of operation during normal answering operation with recording of messages from callers, especially so as to give an indication of the recording of the telephone answering text and closing text by the user of the apparatus; the range II corresponds to function during remote control of the device for remote reproduction and erasure of messages recorded, using the speech controlled code.

In its details the range *a* (beginning at the right in FIG. 20, in accordance with rotation of the indicating scale anticlockwise) corresponds to the erasure of a recording which has been made on the answering unit (by means of erasure heads LK2 and LK3) for any possible re-recording of the answering text. The ranges *b* and *c* are provided for the announcing part of the text: that is to say, for instance, in the first range *b* there can be the recorded words "this is telephone answering device XYZ" while in the range *c* the locality and the telephone number of the connection provided with the device can be recorded. Both parts *b* and *c* of the text are separated by a short pause P (which is of no significance from the third party calling up the device and would not be considered objectionable by him); in this pause the user of the device desiring bring about remote control must intone the vowel "A" via the telephone in order to switch over the device to code operation for remote control.

The range *d* is provided for the part of the answering text asking the caller to speak and indicating the him the amount of speech duration available, for instance in the following wording "you now have 1 minute to record your message"; as mentioned, the device is designed for working in the fixed time mode, in such a manner that the time available for recording a spoken message from a caller is limited to a maximum value as desired by the user of the device. In the embodiment shown in the time available is approximately 1 to 2 minutes. The range *e* corresponds to recording of the message received. In this connection it is to be noted that the length of the range *e* does not represent the time of recording a message in relation to other ranges, since otherwise during recording the answering unit and the control unit, and therefore the indicating scale would not rotate any further. The range *f* is reserved for the confirmation that the message has been recorded, for instance with the wording " your message has been recorded". The range *g* is for the closing words greeting, for instance "the device is now been switched off. Thank you for your call."

It is also to be mentiOned that on the storage capacity of the tape recorder unit the functionS corresponding to the range *d*, *e*, and *f* (invitation to speak, recording of message, confirmation that message has been recorded) can no longer been carried out and in this condition the device acts only as an answering device without any recording of messages taken in place, so that a caller ringing up the number only receives the messages in ranges *b*, *c*, and *g*.

As regards the narrower upper part II representing remote control of the device by the user operating from an external telephone connection so that he receives the messages recorded, the range *a* is again provided for any erasure required of matter recorded in the code part of the answering unit. In range *b* nothing happens in the case of remote control. In the short pause P between the ranges *b* and *c* the user of the device making a telephone call to it must intone the vowel "A", as already mentioned, in order to be able to bring the device into the "remote control" mode of operation; at the same time this represents a first and rough and ready protection against unauthorized persons causing the device to repeat the recorded messages to them. In the following code range *c* at II the numbers "1", "2", "3", and "4" are recorded with short spaces between them as indicated by the black ranges; the user of the device calling from outside must, in order to cause remote functioning of the device intone the vowel "A" after the correct number over the telephone in accordance with the pre-selected code setting. This is not carried out correctly, that is to say if the vowel "A" is intoned after a number for which the code pushbutton has not been pressed or if the vowel "A" is not intoned after a number for which the code button has in fact been depressed, the device automatically prevents the repetition of the recorded messages and remains "dumb" until the range *g* of the lower part I of the indicating scale is reached in such a manner that the caller in this case only hears the closing words. In the case of correct remote control the message is given at range *d* "please wait" and in the time after this the tape recorder is rapidly reversed to the beginning of the messages on the tape. In the range *e* there then follows a playback of the recorded messages to the user who has rung up the device. On reaching the end of the last message recorded the tape recorder unit is automatically switched off and the answering unit then gives in the following range *f*1 the invention for erasure; in the following pause *f*2 the user can intone the vowel "A" so as to give an erase command. Following this erasure occurs (and is confirmed in range *f*4). If after the invitation to erase *f* 1 the erase command "A" is not intoned in the pause *f*2, initiation of the erasure procedure is not carried out and in the ranges *F*3 and *f*4 there follows the final confirmation "not erased".

It should be emphasised that the user of the device ringing up does not need to await the transmission of the whole of the recorded messages after the correct initiation of remote control, and instead can interrupt the communication by replacing his telephone receiver, for instance at an intermediate position in the tape-recorded messages. In this case the device automatically returns to the ready position for further telephone operation, that is to say the tape recorder unit runs back as far as the end of the last message recorded and then automatic switching of the device occurs in the usual manner.

FIG. 21 is a time chart of the actuation of the switching contacts of the control unit; in order to make the course of operation with time more readily intelligible the indicating scale of FIG. 20 is reproduced in the upper part at S, the direction being opposite to that of FIG. 20, in accordance with the usual representation of a time function in a graph with time running from left to right.

In what follows the manner of operation of the device in the various modes of operation is described in detail.

1.0 Answering Operation With Recording of Messages

For this manner of operation the main selector switch S used for selecting modes of operation is moved into the position I ("telephone operation" ); the check lamp La6 is connected with current via the switch contact S-2/2-6 and initially burns uninterruptedly.

1.1 An Incoming Call

Call or ringing current received via the telephone lines Ta and Tb passes via S-3/6-5, S-3/11-12, and R13 C15, Post Office transformer Tr2 and from the secondary side of the latter via the contact *ah*9–8 it passes to the call circuit 507. The call current after rectification and amplification causes the relay AR to be energized. The contact *ar*6–7 of the relay AR causes the motor M1 in the power pack to start it and correspondingly the contact *ar*15–16 causes the motor M2 to be started; *ar*9–10 switches on the DC supply at +2 V in DC output 504 of the power pack 501 for the amplifier; *ar*12–13 causes the magnet MA of the answering unit to be energized via *z*6–5, *d*6–5, and *g*8–9. The magnet actuates the friction wheel of the answering unit and brings it into operation together with the control unit with which it is coupled by means of a step down transmission.

The control contact *m*1 of the control unit maintains the call relay AR in the energized condition via the circuit connection M with the call circuit 507. (As mentioned the carrier of the answering unit makes 12 rotations.)

1.2 Transmission Text For Caller

After a period of about 6 seconds the control contact m2 closes, the relay AH is energized and its contact *ah*6–7 closes the DC loop with the telephone connection.

By means of *ah*9–10 the output W of the reproduction amplifier 509 is connected with the Post Office transfer means Tr2; the magnetic head TK2 of the answering unit connected via *cr*11–12, *k*6–5, *U*8–9 with the input of the playback amplifier 509. The caller thus hears the answering text via the telephone lines T*a* and T*b*.

1.3 Recording of a Message From Caller

The input 519 of the second stage T20 of the recording amplifier 508*a* (see FIG. 19) is connected via the transformer Tr3 (forming a hybrid circuit with transformer Tr2) constantly with the telephone lines in order to amplify incoming speech currents.

After the text of the outgoing message for the caller has been played over (ranges *b* and *c* of the indicating scale I in FIG. 20) and the invitation to speak has been made (range *d* of the indicating scale) *m*3 closes; via *cr*9–8 the X relay is excited while relay S is excited via D16. The S relay short circuits, via *s*6–7, the output of the amplifier 509; via *s*9–10 it switches on the HF generator 116 for producing the HF pre-magnetization for the tape recording unit. Via *x*6–7 the time switch 513 is started; the time switch causes the relay Z to be energized.

If the caller now speaks, the amplified sound signal passes via the circuit connection A to the output of the filter circuit 511; this transmits the NF voltage to the speech switch 510 which, in turn, causes the HR relay to be energized.

Via *z*6–7, *hr*15–16, *ek*1, *d*12–11 the drive magnet MB of the tape recording unit is energized so that the jockey roller is pressed against the sound roller. As a result the tape of the storage unit is transported. This operational state "recording of message" is maintained until either, on the elapse of the maximum duration of message in accordance with the fixed time setting of the device, the time switch 513 interrupts, via the contact *z*6–5 of its relay Z, the supply of current to the drive magnet MB of the tape recording unit, or, within the fixed time period for recording, the speech switch 510 allows the contact means of the relay HR to open, this being so if the caller makes a pause of more than, for example, 6 to 8 seconds. The opening of the contact *hr*15–14 of the relay HR also brings about an interruption of the supply of current to the drive motor MB of the tape recording unit. Simultaneously the switching off of the magnet MB via contact *z*6–5 and contact *hr*15–14 brings about energization of the drive magnet MA for starting the answering unit.

On the first actuation of the tape magnet MB there is a simultaneous closing of the energization circuit for a relay Y, (via D12) whose contacts *y*6–7 immediately close the current circuit of the indicating lamp La7 and maintain it in a closed position to indicate that at least one message has been recorded.

1.4 Final Message to Caller

By the opening of *m*3 the condition in accordance with 1.3 is restored and the caller hears the final part of the answer from the machine.

1.5 Switching off

After the last part of the answer has been transmitted to the caller the control contacts *m*1 and *m*2 are opened. *m*2 deprives the relay AH of current The contact *m*1 causes the relay AR to be open and causes the magnet MA of the answering mechanism to be deprived of current.

The contact *ar*9–10 interrupts the DC output line 504 of the power pack 501 and deprives the amplifiers of current; *ar*6–7 and *ar*15–16 switch off the motors. The contact *ah*6–7 opens DC connection with the telephone connection. The amplifier 509 is put out of circuit via *ah*9–10 and via *ah*91 8 is connected with the call circuit including the telephone line. As a result the device is again in the initial condition for answering a call.

2.0 Telephone Call with Remote Control

This condition of operation belongs, as is the case with the "answering operation with recording of messages" condition described above to the "telephone operation" mode of operation of the device; the main selector switch S for selecting the modes of operation therefore remains in the position I as was the case in section 1.0 above.

2.1 Reception of Call

The call signal or ringing tone causes the same procedure to be initiated as is the case with section 1.1 above.

2.2 Transmission of Answer Text to Caller

This procedure occurs initially, that is to say in the ranges *a* and *b* of the indicating scale, FIG. 20, in the same manner as was described above in section 1.2, that is to say the first part of the answer text for the caller "this is the automatic telephone answering device of Messrs. XYZ" is transmitted after the erasure range *a*.

2.3 A Call with Code

Such a call for remote control is characterized by the pause P (FIG. 20) after the first part *b* of the answer text. At this position the control contact *m*7 is closed and the control contact *m*10 is open. As already mentioned, the filter 511 is constructed so as to have a low degree of sensitivity and small band width over the whole range of rotation of the control unit with the exception of the part in which the control contact *m*3 is closed (that is to say in the recording and playback range).

If the user of the device ringing up now intones at this position P the vowel "A" the NF voltage corresponding to this vowel passes via the recording amplifier 508 and the circuit connection A to the input of the filter circuit 511. The frequences which pass the filter are fed via the pulse forming part T10 and T11 (FIG. 20) to the driver part (T13–T15–T16) of the speech switch 510; the driver stage T16 energizes the HR relay. Via *m*1, *f*6–5, *m*7, *hr*9–10 the code relay CR is energized and is held by the contact *cr*6–7.

The contact *cr*12–13 connects the head TK3 of the code part of the answering mechanism with the input of the playback amplifier 509. The contact *cr*9–8 is switched over after *cr*9–10 and thus interrupts the circuit leaving from *m*3 to the relay X. The answering unit now causes the numbers 1 to 4 recorded in the coding part to be reproduced (see also FIG. 20).

2.4 Correct Giving of Code Clue

As an example it is assumed that for setting the code the clue number 1 is set by pressing the corresponding code push-button.

If now the number 1 is transmitted to the caller and the latter intones "A" in the pause following the number 1, the relay HR energized via the speech switch and remains about 1 second in the energized state (by the opened contact X10–11 the relay HR is set for the short opening time). The contacts *hr*6–7 and *hr*12–13 are closed for this period of time. The control contact *mc*1 closes and closes a circuit via the pushbutton number 1 with D19, *hr*6–7 leading to relay R; this is energized and maintains itself in the energized position via the contacts *m*1, *f*6–5, and *r*6–7.

If during the following playback or reproduction of the code numbers 2, 3, and 4 no "A" is intoned in accordance with code setting, the control is correct and the code circuit condition is maintained.

2.5 Caller Gives Wrong Code Clue 2.5/1 Example 1

Let it be assumed that the pushbutton of the code selector corresponding to the clue number 1 has been depressed. The number 1 is played back to the caller who does not intone the vowel "A". The contacts *hr*5–6 and *hr*–11–12 remain closed; *mc*1 closed; via the pushbutton 1 and *hr*11–12 the energization current circuit for the relay F is closed which is energized and maintain itself in the close position via the contacts *m*1, *f*6–7.

2.5/2 Example 2

In this case it is assumed that the pushbutton of the code selector has been depressed for the clue number 2. It is also assumed that after the announcement or playback of the number 1 the caller intones the vowel "A". As a result the HR relay is excited, *hr*12–13 is closed and *mc*1 is energized; via the pushbutton 1, the contact *hr*12–13 an energization current circuit for the "false" relay F is closed; this is energized and holds itself in the energized condition via the contacts *m*1, *f*6 to 7.

2.5/3 Example 3

Let it again be assumed that the pushbutton for the clue number 1 has been depressed. On the number 1 being given to the caller, the vowel "A" is intoned correctly so that the procedure in accordance with section 2.4 occurs, that is to say control procedure is correctly initiated.

However, during the following playback the vowel "A" is intoned after the number 2 has been played back. As a result the relay HR is energized, closes the contact *hr*12–13, *mc*2 closes so that there is again a closing of the energization circuit for the false relay F via *mc*2 and *hr*13–12. The relay F opens *f*6–5 and causes the previously energized "correct" relay R to be de energized so that it contacts are actuated. Simultaneously the "false" relay F supplies itself with holding current by the closing of the contacts *f*6–7. Thus, the correct initiation of control procedure is overridden by a false signal.

2.6 "Dumb" Circuiting in Response to "false" Setting

Via *f*6–7 the diode D15 is supplied with current and since it is conducting in this current direction, the contact *m*4 is supplied with current.

By the contact *m*4 the playback circuit arrangement is maintained for a duration of the series code numbers. After playback of the numbers *m*6 is opened and *m*4 closes. The code relay CR is de-energized and switches, via *cr*11–12, the magnetic head TK2 of the answering unit so as to be connected with the playback amplifier 509. By the closing of *m*4, furthermore, the relay S is energized via the diode D17 which operates as a return current diode. The relay S is energized by means of its contact *s*6–7 short circuits the output of the playback amplifier 5 and 9; the output of the playback amplifier is only opened again when the final part of the message for a caller is reached. By opening the contact *f*6–5 the relay CR is deprived of current and is de-energized. As a result the magnetic head TK3 is switched off and the magnetic head TK2 is switched on so that the final part of the message for the caller is fed into the telephone line. There then follows the switching-off of the device so as to return to the ready position, as described in section 1.5.

2.7 Playback to a Telephone Caller Following Correct Setting

After the playback of the series of code numbers the words "correctly set, please wait" are to be heard; following this the contact *m*6*b* is closed. Via diode D7 the winding 2 of the relay D is caused to attract; *d*6–5 is opened and the magnet MA of the answering unit remains open until the control unit opens the contact *m*5*b* and the circuit via the diode D6 is interrupted.

2.7/1

While *d*6–5 is opened, *d*9–10 is closed and the reverse magnet RM of the tape recorder unit together with the magnet M of the marking drive are excited via *g*6–5, 16–5, and *d*15–16. They bring about reverse movement of the tape and release of the marking contact *mk*. Shortly before the start of the tape *ak* is closed and the relay G is energized via *g*14–15, *g*12–11; the contact *g*6–5 opens and the magnet M of the marking drive is de-energized. The contact *g*6–7 closes the circuit of the winding 1 of the relay D; the direction of magnetization of the relay is reversed and as a result *d*9–10 is opened and the reverse magnet RM of the tape recorder is deprived of current so that reverse is switched off. By closing *g*6–7 the drive magnet MB for forward movement of the tape recording unit is energized. This magnet presses the jockey against the sound roller so that reproduction, that is to say playback, of the recorded messages can be carried out, since, also, shortly before the closing of the contact *m*5*b* the contact *m*8 is closed and energizes the relay U via D13, this relay connects the magnetic head TK1 of the tape recording unit via *u*12–13, *u*10–9 with the input of the playback amplifier 509. In this manner there now occurs a playback of the recorded messages to the telephone caller. When the end of the messages in the storage means is reached, the marking contact *mk* is closed. The second winding of the relay G is energized via *g*16–15 and *g*12–13. As a result the direction of magnetization of the relay G is reversed and the relay returns to its rest position; further the magnet MB of the tape recording unit is de-energized and via *g*8–9 the magnet MA of the answering unit is caused to exert an attractive force; the answering unit continues to run and plays the invitation to erase the text (see range *f*1 in the upper part II of the indicating scale in FIG. 20).

2.8 Erasure Brought about by Caller

If, after the invitation to erase messages (range *f*1 in FIG. 20) the vowel "A" is intoned (in the range *f*2 in FIG. 20), the contact *m*5*a* is closed at this point in time; via *hr*9–10, *m*5*a*, D11 the erase relay LR is energized. 16–5 opens. In consequence the magnet M of the marking drive cannot attract and the marking contact mk remains blocked. The relay LR holds itself energized via 16–7; 19–10 switches on the HF generator 516 (FIG. 17) so that the erase head LK1 of the tape recording unit is energized with HF current.

Furthermore the relay D is energized via D10 and the drive magnet MA of the answering unit is also energized via *m*5*a*, D10 as long as *m*5*a* remains closed. As a result the word "erased" is played over to the caller (in the range *f*4 in FIG. 20). Owing to the attraction of the relay D the reverse magnet RM is energized via the closed contact *d*9–10 and causes reverse of the storage unit; via D3, *cr*15–16 current is supplied to the contact *m*5*a* so that the supply current circuit for the drive magnet MA of the answering unit is maintained, even on de-energization of the relay HR, until the contact *m*5*a* is opened. It is only after this that the magnet MA ceases to be energized so that the answering unit is halted, since *d*6–5 is opened. While *d*5–6 is opened, *d*9–10 is closed and the reverse magnet RM is energized.

2.8/1

The energization of the reverse magnet RM bring about reverse movement of the tape. Shortly before the start of the band is reached *ak* is closed. Via *g*14–15, *g*12–11 relay G is energized. *g*5–6 is opened, so that the erase relay LR is deprived of current and returned to its resting position. The HF generator 516 is switched off by the opening of contact 19–10 so that the erase procedure is terminated.

Simultaneously the contact *g*6–7 is closed so that the winding 1 of the relay D is supplied with current. The relay therefore has its direction of magnetization changed and returns to its rest position so that *d*9–10 is opened and the reverse magnet RM is caused to return to its rest position so that reverse movement of the tape is terminated. By the closing of *g*6–7 the magnet MB receives current for forward tape movement. The storage unit runs for a short time and closes the marking contact *mk*. As a result the second winding of the relay G receives current via *g*16–15, *g*12–13 so that the direction of magnetization of the G relay is reversed and it returns to its rest position. Furthermore the forward magnet MB of the tape recording unit is de-energized so that the tape recording unit returns to its initial position with an erased tape so as to be ready for the recording of new messages.

2.8/1

Via *g*9–8 the magnet A is energized; the answering unit runs into its zero position and switches over the device in readiness for the next telephone call.

2.9 Termination of Playback to Telephone Caller without Erasure

If, after the invitation to erase the vowel "A" is not intoned the caller will hear "not erased", in the ranges *f*3 and *f*4 of the indicating scale, see FIG. 20. The device runs back into its zero position and switches over to the ready state, that is to say the tape recorder runs as far as the end of the last recording and switches over to the ready condition for recording further incoming calls, while the answering unit returns to its zero position in the manner mentioned and the device as a whole assumes its output-ready position for the next call.

In what follows series of so-called internal modes of operation (corresponding to positions II to V of the main selector switch S) are explained. In these "internal" manners of operation the device is thus not controlled via a telephone line but is operated directly by the user manually.

3.0 Recording of an Internal Message

In this mode of operation the tape recording unit of the device can be used in a conventional manner for recording a message or dictation. For this purpose the main selector switch S is brought into its position II ("internal recording"). In this switch position the microphone socket Bu1 on the front side of the device is connected via S-1/11-7 with the input 517 (FIG. 19) of the playback amplifier 508. Via D26 and the switch contact S-2/1-5 the relay S receives DC. The current circuit for the relay AR is closed via S1/1-3. The drive motors M1 and M2 are started.

3.1 Starting Control with Microphone Pushbutton and Dictation

If the starting pushbutton is pressed when the microphone is connected, the pins 4–3 of the microphone socket Bu1 are connected together by the microphone pushbutton so that the circuit connection B of the drive magnet MB of the tape recording unit is excited. The tape of the storage unit is therefore transported. Via *s*9–10 and the conducting connection G the HF generator 516 receives DC. As a result the erase head LK1 of the tape recording unit is excited and at the same time the HF pre-magnetizing current flows through the magnetic head TK1 of the recording unit. The NF voltage produced by the microphone is amplified in the recording amplifier 508 and passes via the linearizing component R139, R138 to the magnetic head TK1.

As long as the relay S is energized, the output of the playback amplifier 509 is short-circuited via *s*7–6 so that if the volume regulator is turned up there can be no acoustic feedback.

4.0 Internal Playback of Recorded Messages

For this mode of operation main selector switch S is brought into its position III ( tape playback"); all internal procedures are then caused to occur automatically. In this position of the switch S-1/1-2 closes and energization current circuit for the relay AR; the switch contact S-2/1-4 is closed and applies a DC voltage to the playback pushbutton (reproduced in FIG. 17 by the symbol given in FIG. 17*a*) and energizes the relay U; via *u*12–13 and *u*10–9 the magnetic head TK1 of the tape recorder is applied to the input of the playback amplifier 509.

4.1 Playback of Messages

On depressing the playback pushbutton the relay D is energized via D4 so that the course of functions described above in section 2.7/1 occurs, it being taken into account, however, that in the present mode of operation the control unit remains in the zero position and all control contacts *m*1 to *m*10 are open.

4.2 Short-Distance Reverse Movement During Playback of Messages

If the short-distance reverse button (denoted by the symbol given in FIG. 17*a* in FIG. 17) is pressed the supply of current of magnet MB of the tape recording unit is interrupted and supplied via D1 to the reverse magnet RM and the magnet M of the marking drive. The band reverse starts and continues as long as the reverse pushbutton is depressed.

4.3 Stopping Using Stop Pushbutton During Playback

The stopping pushbutton (indicated in FIG. 17 by the symbol given in FIG. 17*a*) is provided with a detent. Therefore the flashing circuit 512 is provided which causes the lamp La6, which shines continuously in the "telephone mode of operation", to flash as long as the stop button is depressed. Furthermore the stop button interrupts the supply of current to the sound roller jockey roller magnet MB of the tape recorder.

4.4 Internal Erasure of Messages

For this purpose the erasure button (indicated in FIG. 17 by the symbol given in FIG. 17*a*) is pressed whose function can be brought about by simultaneous operation of the playback pushbutton. For erasing messages recorded in the storage unit, the erase pushbutton is depressed and then the playback pushbutton. This results in the following occurring. By depressing the erase pushbutton the holding contact 16–17 of the relay LR is bridged over; on pressing the playback button the relay LR and the relay D is supplied with regulating current via D4. Both relays are simultaneously energized and via *d*9–10 the reverse magnet RM is energized. 19–10 switches on the HF generator 516 so that the erase head LK1 is supplied with HF erasing current. Further operation occurs as described in section 2.8/1 above.

5.0 Playback Check of Recorded Answering Text

For this purpose the main selector switch is moved into its position IV ("playback of answering text"). As a result S-3/2-3 and S-1/1-2 are switched into circuit. The microphone is connected with the socket Bu2 provided on the rear side of the device.

5.1

By the microphone pushbutton switch the plug pins 4–3 of the socket Bu2 are short-circuited and the contact *m*1 is short circuited via the circuit points M and +1 V. The answering unit is started in the following sequence. The call circuit 507 is brought into operation by means of the circuit connection M and energizes the relay connected with its output. Via *ar*7–6 the motor M1 is switched into circuit while the motor M2 is switched into circuit via the contact *ar*16–15. *ar*12–13 brings the magnet MA of the answering unit into operation so that the answering unit is started. *ar*9–10 connects the amplifier with voltage. In this condition the answering text (range *b* and *c* in FIG. 20) the invitation to speak (range *d* in FIG. 20) and the closing words (range *f* and *g* in FIG. 20) are to be heard. The volume can be set by means of the volume regulator of the playback amplifier. After this procedure has been completed *m*1 opens and the relay AR and the magnet MA are de-energized. The device thus remains in the zero position.

5.2 Playback for Checking of the Code Text

The main selector switch S remains in the position IV (that is to say "playback of answering text"); however, additionally the code pushbutton C at the rear of the device is depressed; as a result the code relay CR is energized and connects via *cr*13–12 the magnetic head TK3 of the code part of the answering unit with the playback amplifier input. Operation is then as described in section 5.1.

After the end of checking the code pushbutton C is released by depressing it again.

6.0 Recording of Answering Text

For this the main selector switch S is moved into its position V ("record"). In this position the contacts S-1/1-2, S-1/7-8, S-2/7-8, S-3/7-8, S-3/1-2, S-2/1-2 are closed.

Via S-2/1-2 the relay K is energized while the relay S is energized via the diode D14. Via *k*12–13 and *k*7–6 the magnetic head TK2 (for the answering part of the answering unit) is connected with the output of the recording amplifier 508. Via *s*9–10 the HF generator 516 is brought into circuit so that HF pre-magnetizing current is supplied to the magnetic head TK2. After closing of *m*9 an AC current at line frequency is supplied via S3/7-8 for about one and a half revolutions of the answering unit (corresponding to range *a* of the scale in FIG. 20) to the erase winding LK2. All following steps occur as in section 5.1 above, though in order to avoid acoustic feedback the input of the final amplifier 517 is short circuited via S-2/7-8.

6.1 Recording of Code Text

The procedure is substantially as in section 6.0. HOwever, there is the additional feature that the code pushbutton C is depressed so that the CR relay is energized; *cr*13–12 connects the magnetic head TK3 of the code part of the answering unit with the amplifier output and the pushbutton C disconnects by means of a mechanical linkage, shown in broken lines in FIG. 17, the erase head LK2 while the erase head LK3 of the code part of the answering unit is connected with *m*9 and thus with the power pack 501 for supply of AC erase current.

After the end of the recording of the code text the pushbutton C is released. It should be pointed out that the code text can conveniently be dictated by the manufacturer. It is not changed during use of the device so that the above-described function 6.1 does not arise in normal use of the device, or only arises occasionally.

The embodiments of the invention in which an exclusive property or privilege is claimed are as follows:

1. In a device for automatic telephone answering adapted to play over a text which has been pre-recorded by the user of the device to a telephone caller, to record messages from telephone callers, and to playback and selectively erase previously stored messages of telephone callers upon actuation by code signals transmitted through the telephone line under remote control by a user, comprising an answering unit including first magnetic recording and playback means having separate storage capacities for recording and playback of the answering text and of code information, respectively; second magnetic recording and playback means for recording and playback of incoming messages; electrical circuit means including a main selector switch for selecting various circuit configurations among the electrical circuit means in accordance with different modes of operation; a speech controlled code switch and associated circuit components in the electrical circuit means; a control unit for automatically controlling the cyclical functioning of the device during a cycle of function in the various modes of operation; wherein said first magnetic recording and playback means comprise a disc-shaped magnetic recording carrier having separate tracks for recording the answering text and the code information, respectively, separate magnetic heads cooperating with the said separate recording tracks, wherein said control unit comprises plural rotary timing discs having contact tracks thereon, and associated stationary contact sets cooperating with the said contact tracks and a rotary indicator disc directly operatively connected with said timing discs; and wherein said answering unit including the disc-shaped magnetic recording carrier of the first magnetic recording and playback means, and said control unit including said rotary timing discs and said indicator disc are combined in an integrated constructural sub-assembly having said first magnetic recording and playback means and said control unit, said sub-assembly having common mechanical drive means directly operatively connected with said magnetic disc recording and playback means, said rotary timing discs and said indicator disc.

2. A device in accordance with claim 1 further comprising a rotary cylindrical knob connected with the main selector switch, and a lock for preventing unauthorized rotation of the knob, said device further comprising:

a stationary element, generally underlying the knob, the stationary element having arcuate slot; a projection on the lock extending into the slot; a key for the lock, the key being adapted to turn the lock pin projection in the slot to move the lock pin clear of obstructing parts of the stationary part in the slot, thus making rotation of the knob conditional upon operation of the key.

3. A device in accordance with claim 1 comprising:

a tape recorder unit for recording telephone messages;

a marking drive;

a stepdown drive connecting the tape recorder unit with the marking drive, the tape recording unit cooperating for automatic location of tape start, tape end, and the end of the last message recorded on the tape;

said marking drive comprising a gear wheel connected by the stepdown drive in accordance with rotation of a supply spool of the winding station of the tape recorder with such a stepdown ratio that after full forward travel of the tape recording unit there is a rotation of the marking drive gear wheel of about 350°;

an actuating projection on the periphery of the gear wheel, which is driven by the stepdown drive, of the marking drive;

contacts on the projection for locating tape start and tape end;

a slipping clutch;

a slipping clutch disc arranged to be driven by the slipping clutch from the drive gear wheel;

a further actuating projection on the slipping clutch disc;

a marking contact which cooperates with the further actuating projection for marking the end of the last message recorded on the tape.

4. A device in accordance with claim 3 comprising a marking magnet, an armature of the marking magnet, and a locking bolt provided on the armature, the actuating projection, on the sliding clutch disc, cooperating with the marking contact, being locked during slow forward travel of the tape recording unit in the non-energized position of the magnet in a position corresponding to the closed position of the marking contact by a locking bolt provided on the armature of the marking magnet, it being released out of the blocked position only during rapid reverse movement of the tape recorder, the marking magnet being energized during this movement.

5. A device in accordance with claim 1, in which the code switch comprises:

pushbutton contacts for setting different code numbers;

a general code relay for switching over the device from answering and recording operation to code operation by the caller of the device (via a telephone line) whereby messages recorded by a previous caller may be transmitted to the instant caller by telephone;

a correct relay which responds to sounds transmitted via a telephone line in accordance with the code, and a false relay which responds when sounds, transmitted via telephone line, are received by the device which are not in accordance with the code;

and further comprising a release relay for controlling actuation both of the general code relay and of the correct and false relays;

a speech switch, controlling energization of the release relay, said speech switch being responsive to pre-set speech frequencies given at intervals in time in accordance with a code text;

a filter arranged for conducting speech currents from a telephone channel to the said speech switch and comprising an input current amplifying discriminating stage, to which amplified speech currents are supplied, a filter circuit arranged to receive output magnitudes from the said filter discriminating stage, and an emitter follower connected with the output of the filter circuit, the output of the emitter follower being arranged to be supplied to the speech switch;

means for causing said filter to pass frequencies corresponding to particular speech frequencies during part of operation of the device;

said speech switch further comprising a two-stage input pulse shaping circuit for converting speech currents into rectangular pulses, and a current amplifying stage and a driver end stage for the said release relay;

a time switch;

a relay means for starting the said time switch at the beginning of each recording of a telephone transmitted message;

an output relay for cutting off recording of a message after a fixed time has elapsed, the timing switch comprising a unijunction transistor, means connected with said unijunction transistor to form a multi-vibrator, and a driving stage of the output relay;

a forward tape travel control magnet for controlling forward tape travel in the tape recording unit;

first contact means of the output relay controlled by the timing switch;

second contact means of the said release relay controlled by the said speech switch, the first and second contact means being connected together in series for the supply of energization current to the forward tape travel control magnet in such a manner that on the expiry of the maximum time allowed for the recording of the message the recording connection is interrupted by release of the output relay controlled by the timing switch and by the release of the relay controlled by the said speech switch if the caller ceases to speak for more than a given interval, the given interval corresponding to a release time of the relay controlled by the said speech switch, this release time being made longer than the release time during code operation.

6. A device in accordance with claim 5, comprising a volume limiting circuit forming part of the recording amplifier and serving for automatically limiting the output volume of the said amplifier so that the volume has a constant signal level, said limiting circuit comprising a transistor in the input circuit of an amplifying stage, the said limiting circuit transistor being connected so as to be free of DC voltage and so as to act as a control variable shunt resistance;

an emitter-collector loop in said amplifying stage input circuit transistor, said transistor being driven in an emitter-base circuit and having its conductivity controlled by an additional control transistor, said control transistor being responsive to the said amplifier output.

7. A device in accordance with claim 6 comprising a condenser connecting the output of the recording amplifier of the volume limiting circuit with the base of the control transistor connected in an emitter base circuit, the control transistor being arranged to produce a DC signal corresponding to the level of the output of the recording amplifier, this signal being passed to the base of the regulating transistor for controlling the conductivity.

8. A device in accordance with claim 7 in which the regulating transistor is arranged to act on the same amplifying stage of the recording amplifier as that to which telephone speech currents are passed via the input line, the point of connection of the regulating transistor of the volume limiting circuit between the amplifier stages being blocked to DC on both sides.

* * * * *